United States Patent [19]

Chang et al.

[11] Patent Number: 5,329,573
[45] Date of Patent: Jul. 12, 1994

[54] ARRANGEMENT FOR OBTAINING AUTHENTICATION KEY PARAMETERS IN A CELLULAR MOBILE TELECOMMUNICATIONS SWITCHING NETWORK

[75] Inventors: Cheng-Tze Chang, Lisle; Chinmei C. Lee, Woodridge; Yie-de Zhu, Naperville, all of Ill.

[73] Assignee: AT&T Bell Laboratories, Murray Hill, N.J.

[21] Appl. No.: 799,580

[22] Filed: Nov. 27, 1991

[51] Int. Cl.$^5$ ..................... H04M 11/00; H04L 9/00; H04Q 7/00
[52] U.S. Cl. ........................ 379/58; 379/57; 379/59; 379/60; 380/21; 380/44; 380/46; 44/46; 455/34.1
[58] Field of Search ............ 370/60; 379/57, 58, 379/59, 60, 61, 62, 63; 380/46, 44, 21; 455/31.1, 34.1

[56] References Cited

U.S. PATENT DOCUMENTS

| | | | |
|---|---|---|---|
| 4,398,063 | 8/1983 | Hass et al. | |
| 4,794,636 | 12/1988 | Sanglier et al. | 379/62 |
| 4,829,554 | 5/1989 | Barnes et al. | 379/58 |
| 4,833,701 | 5/1989 | Comroe et al. | 379/60 |
| 4,899,333 | 2/1990 | Roediger | 370/60 |
| 5,036,531 | 7/1991 | Spear | 379/58 |
| 5,046,082 | 9/1991 | Zicker et al. | 379/59 |
| 5,060,264 | 10/1991 | Muellner et al. | 380/46 |
| 5,097,499 | 3/1992 | Cosertino | 379/59 |
| 5,123,111 | 6/1992 | Delory et al. | 455/34.1 |
| 5,140,626 | 8/1992 | Ory et al. | 379/57 |
| 5,153,902 | 10/1992 | Buhl et al. | 379/57 |
| 5,153,904 | 10/1992 | Coombes et al. | 379/58 |
| 5,153,919 | 10/1992 | Reeds, III et al. | 380/44 |
| 5,241,598 | 8/1993 | Raith | 380/21 |

FOREIGN PATENT DOCUMENTS

| | | | |
|---|---|---|---|
| 0174419 | 1/1985 | European Pat. Off. | H04Q 7/04 |
| 0438099 | 1/1991 | European Pat. Off. | H04Q 7/04 |
| 0464425 | 1/1992 | European Pat. Off. | H04Q 7/04 |
| 0512962 | 11/1992 | European Pat. Off. | H04Q 7/04 |

OTHER PUBLICATIONS

"Intelligente Vermittlungsfunktionen fur Mobilkommunicationsnetze-Teil 2", *NTZ Nachrichtentechnische Zeitschrift*, vol. 43, No. 5, May 1990, pp. 380–385.
Copy of European Search Report for Chang 1-6-1, Ser. 07/799,580 EPO application (now abandoned).
Copy European Search Report for D. J. Howard 1-7-1-3-1-3, Ser. No. 07/884,666, EPO application.
Copy European Search Report for W. C. LaForge 1-4-3, Ser. No. 07/799,246 EPO application.
A. Carrie et al., "Matracom 9200 Et Axe 10 Un Systeme Flexible Pour Les Resau GSM", *Commutation Et Transmission*, vol. 13, No. 1, Mar. 1991, pp. 5–18.
Sakti Pramanik, "Generalized Parallel Processing Models For Database Systems", *International Conference On Parallel Processing*, vol. 3, Aug. 1988, pp. 76–83.

(List continued on next page.)

*Primary Examiner*—Curtis Kuntz
*Assistant Examiner*—William D. Cumming
*Attorney, Agent, or Firm*—Werner Ulrich

[57] ABSTRACT

Apparatus and methods for providing cellular mobile telecommunication service in accordance with the requirements of the Global Systems for Mobile Communications (GSM) standard. A modular switching system is provided which performs the functions of the mobile switching center plus those of a home location register, authentication center, visitor location register, and equipment identity register. The latter functions are advantageously spread among the modules of the switching system, thus avoiding the getting started cost of expensive dedicated data bases. A wireless global switching module advantageously switches mobile communications control messages among the modules of the system and between the modules and the base station systems, and terminates signaling links between the mobile switching center and the base station systems.

3 Claims, 29 Drawing Sheets

OTHER PUBLICATIONS

Copy European Search Report for W. C. LaForge 2-5-4, 07/799,508 EPO application (now LaForge 3-1-0-10, Ser. No. 08/098,260).

M. Ballard et al., "Digital Cellular Mobile-Radio System ECR900", *European Transactions On Telecommunications And Related Technologies,* vol. 1, No. 1, 1990, Milano, IT, pp. 17-30.

J. Delory et al., "Security And Saturation Solutions for GSM", *Telephone Engineer and Management,* vol. 95, No. 2, Jan. 16, 1991, pp. 50-54.

Copy European Search Report for Lee 2-2-1-1, Ser. 07/799,589, EPO application (now Lee 9-9-3-3, Ser. No. 08/098,167).

Ballard, Issenmann, Sanchez "Cellular Mobile Radio as an Intelligent Network Application" Electrical Comm. 1989.

GSM (European Global Systems for Mobile Communications) 01.02-version 3.0.0-"General Description of a GSM PLMN", Jan. 1990, pp. 1-17.

GSM 01.04-version 2.00.00-"Vocabulary in a GSM PLMN", Jan. 23, 1990, pp. 1-45.

GSM 02.01-version 3.0.0-"Principles of Telecommunication Services Supported by a GSM PLMN", Jul. 15, 1988, pp. 1-15.

GSM 02.16-version 3.0.0-"International Mobile Station Equipment Identities", Jul. 15, 1988, pp. 1-5.

GSM 03.02-version 3.1.3-"Recommendation GSM 03.02 Network Architecture", Apr. 12, 1989, pp. 1-14, plus 1 annex page.

GSM 03.12-version 3.1.4-"Location Registration Procedures", Jan. 15, 1990, pp. 1-11.

GSM 04.01-version 3.0.1-"MS-BS Interface-General Aspects and Principles", Nov. 15, 1988, pp. 1-7.

GSM 04.08-version 3.8.0-"Mobile Radio Interface Layer 3 Specification", 1989, pp. 1-416 plus annexes.

GSM 02.09-version 3.0.0-"Security Aspects", Jul. 15, 1988, pp. 1-11.

GSM 02.17-version 3.1.1-"Subscriber Identity Modules, Functional Characteristics", Apr. 15, 1989, pp. 1-12.

GSM 03.20-version 3.3.0-"Security Related Network Functions", Feb. 21, 1990, pp. 1-28, plus 18 in annex 1, 3 in annex 2, and 6 in annex 3.

| LAYER | SWITCH/SWITCH | | MOBILE SWITCHING CENTER/ MOBILE SWITCHING CENTER/ VISITOR LOCATION REGISTER/ HOME LOCATION REGISTER/ EQUIPMENT IDENTITY REGISTER | MOBILE SWITCHING CENTER/ BASE STATION SYSTEM | MOBILE SWITCHING CENTER/ MOBILE STATION |
|---|---|---|---|---|---|
| APPLICATION 7 | TELEPHONE USER PART | ISDN USER PART | MOBILE APPLICATION PART TRANSACTIONS CAPABILITIES APPLICATION PART TRANSACTIONS CAPABILITIES | RADIO SUBSYSTEM APPLICATION PART BASE STATION SYSTEM MANAGEMENT APPLICATION PART | RADIO SUBSYSTEM APPLICATION PART DIRECT TRANSFER APPLICATION SUBPART |
| NETWORK 3 | | | SCCP | SCCP CONNECTIONLESS | SCCP-CO |
| | SS7 MTP-3 CCITT Q.701-Q.707 | | | | |
| DATA 2 | SS7 MTP-2 CCITT Q.701-Q.707 | | | | |
| PHYSICAL 1 | SS7 MTP-1 CCITT Q.701-Q.707 | | | | |

*FIG. 3*

ARRANGEMENT FOR OBTAINING AUTHENTICATION KEY PARAMETERS IN A CELLULAR MOBILE TELECOMMUNICATIONS SWITCHING NETWORK

CROSS-REFERENCE TO RELATED APPLICATION

This application is related to the applications of:

Chinmei Chen Lee, James Joseph Phelan, Luat Tan Phung, and Alex Lawrence Wierzbicki, Ser. No. 07/799,589, entitled "Handover Of Mobile Radio Calls Between Base Station Systems" now abandoned;

Robert Byerly Beeson, Jr., Patrick Ernest Helmers, and Michael Vincent Stein, Ser. No. 07/799,573 entitled "Signaling Arrangements In A Cellular Mobile Telecommunications Switching System" now abandoned;

Robert Byerly Beeson, Jr., Patrick Ernest Helmers, and Michael Vincent Stein, Ser. No. 07/799,577 entitled "Maintaining Stable Virtual Circuit Data Connections" now U.S. Pat. No. 5,289,179;

Robert Byerly Beeson, Jr., Louis Lawrence Kittock, and Michael Vincent Stein, Ser. No. 07/799,581 entitled "Paging Arrangements In A Cellular Mobile Switching System" now U.S. Pat. No. 5,278,890;

Wayne Clifford La Forge, Chinmei Chen Lee, and James Joseph Phelan Ser. No. 07/799,246 entitled "Implementation Of A Home Location Register For A Cellular Mobile Telecommunications Switching Network" now abandoned;

Wayne Clifford La Forge, Chinmei Chen Lee, and James Joseph Phelan, Ser. No. 07/799,508 entitled "Arrangement For Implementing A Visitor Location Register In A Cellular Mobile Telecommunications Switching System" now abandoned; and Jack Kozik, Chinmei Chen Lee, and Dennis J. Wiest, Ser. No. 07/799,584, "Arrangement For Detecting Fraudulently Identified Mobile Stations In A Cellular Mobile Telecommunications Network" now abandoned; which applications are assigned to the assignee of the present application, and which were filed concurrently therewith on Nov. 27, 1991.

TECHNICAL FIELD

This invention relates to authentication arrangements for mobile telecommunications networks.

PROBLEM

Mobile radio systems for permitting customers calling from mobile stations such as vehicular stations mounted in automobiles, portable stations of medium weight which may be transported readily, or small lightweight, hand held personal communication stations are becoming increasingly prevalent. Such systems use the principles of cellular technology to allow the same frequencies of a common allocated radio bandwidth to be reused in separated local areas or cells of a broader region. Each cell is served by a base transceiver station comprising a group of local transceivers connected to a common antenna. The base station systems, each comprising a controller and one or more transceiver stations are interconnected via a switching system, a mobile switching center, which is also connected to the public switched telephone network. Such cellular systems are now entering a second generation characterized by digital radio communications and a different set of standards such as the European Global Systems for Mobile Communications (GSM) standard, promulgated by the Special Mobile Group (SMG).

The standards specified by the GSM require authentication either on every service request or on randomly selected ones of the requests. The authentication procedure as specified by GSM involves obtaining data from a home location register which, in turn, requires the obtaining of data from an authentication center. Since a query of the home location register is likely to require an access using a data network, the authentication process requires substantial use of the resources of a mobile telecommunications network. In brief, when the authentication of a mobile station is required, the home location register (HLR) is queried in order to obtain a authentication key. The home location register, in turn, requests an authentication center to obtain a random number and converts the random number and the basic key into an authentication number and a cipher key. The random number, authentication number and cipher key are transmitted to a Visitor Location Register (VLR) for serving that mobile station. The random number is then transmitted to the mobile station which is equipped with the identical basic key and uses the random number to generate an authentication number and a cipher key for use with a call. The authentication number, but not the cipher key, is then transmitted back to the mobile switching center serving the mobile station. If the authentication number generated by the mobile station matches the authentication number by the combination of the home location register and the authentication center, then authentication has been satisfied.

A problem of the prior art is that the authentication procedure uses a large amount of the resources of a mobile telecommunications network, and that it introduces substantial delay in establishing calls from or to mobile stations.

SOLUTION

The above problem is alleviated and an advance is made over the prior art in accordance with the teachings of this invention wherein, a plurality of authentication parameters are stored in the visitor location register so that the process of querying the HLR is usually or always avoided. In one specific implementation, as soon as the VLR is down to one set of authentication parameters, it requests another plurality, so that the VLR never has to wait for authentication parameters when it receives a service request or other demand for such parameters. Advantageously, this arrangement substantially decreases the amount of time required for authentication.

In accordance with one specific implementation of applicant's invention, the authentication center comprises a protocol handler. This protocol handler receives a key from the HLR, generates a random number, and using the random number and the key, generates an encryption key and an authentication number. It does this four times in order to supply four additional sets of authentication parameters to the VLR.

In accordance with one specific implementation of applicant's invention, the mobile switching center is a modular switching system and the HLR is stored in modules of the mobile switching center that is the home switching center for a group of mobile stations. Each module has an associated authentication center protocol handler for generating the authentication parameters. Advantageously, this arrangement avoids the necessity of making a data network query to obtain authentication data if the mobile station is in its home area.

BRIEF DESCRIPTION OF THE DRAWING

FIG. 3 illustrates the various signaling protocols used for signaling messages in mobile telecommunications systems;

DETAILED DESCRIPTION

Figure 1:
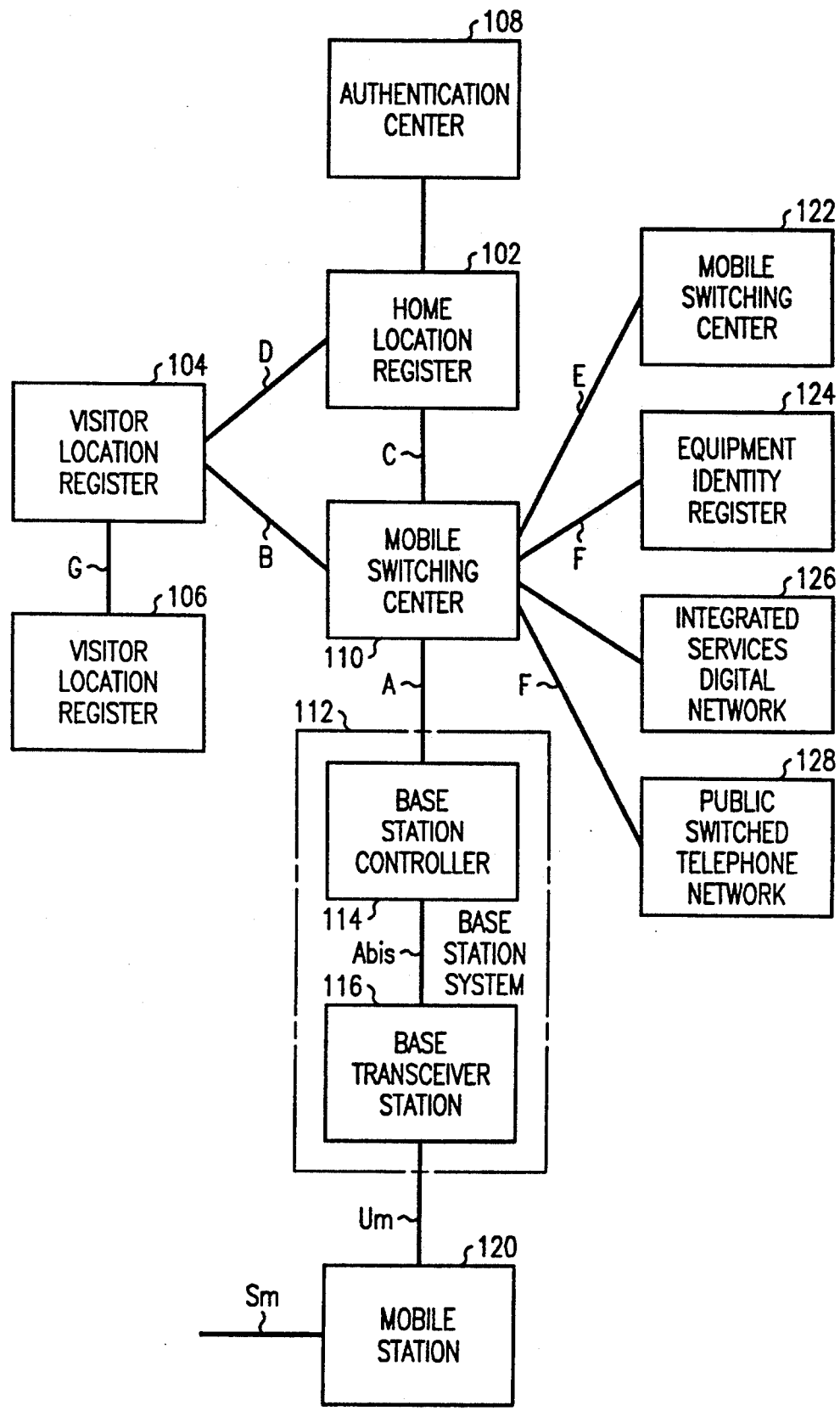
FIG. 1 is a block diagram of the basic GSM model of a mobile switching center and its direct and indirect interfaces.

FIG. 1 is a block diagram of the reference model for the European standard, the Global Systems for Mobile Communications (GSM). Each of the lines interconnecting blocks of the diagram that is identified with a letter, has a GSM standard specified interface. Briefly, the purpose of each of the blocks is the following:

The Home Location Register (HLR) 102 contains data for a mobile customer. The data stored in the HLR is the permanent data that is independent of the customer's present location, plus temporary data such as the addresses of Service Centers which have stored short messages for a mobile station. (An example of such a message is a request to turn on a "voice message waiting" lamp indicating that a voice message has been stored for the mobile station user in a voice messaging system.) These addresses are erased after the short messages have been delivered. The HLR also indicates the Signaling System 7 point code used to find a module that contains the Visitor Location Register (VLR) 104 currently associated with the mobile station.

The VLR contains current data for each mobile customer, including that customer's mobile station's present or most recently known location area, the station's on/off status, and security parameters. A remote VLR 106 connected via a G interface is also shown.

The authentication center (AUC) 108 provides authentication and encryption parameters to ensure that a mobile customer cannot falsely assume the identity of another mobile customer and provides data for encryption of the voice or data, and control signals transmitted via the air between the mobile station and a serving BSS. The GSM referece model prescribes digital communication over the radio channels. Since it is possible to listen to these radio channels, encryption becomes desirable for the link between the mobile station and the radio transceiver at a base station serving that mobile station.

The Mobile Switching Center (MSC) 110 is for switching calls involving at least one mobile station.

The BSS 112 comprises a base station controller (BSC) 114 and one or more base transceiver stations (BTS) 116 for communicating with mobile stations (MS) 120. The BSS and the MS communicate via radio connections. The BSS is also connected via trunks to carry the voice or data, and control messages between the mobile stations and the MSC. The BSC and BTS may be in different physical locations (for example, the BSC may be co-located with the MSC) in which case a trunk is required to interconnect the two. $S_m$ represents the human interface to the MS.

The equipment identity register (EIR) 124 retains a record of ranges of certified equipment identifications and ranges of or individual equipment identifications which are under observation or barred from service. The equipment identification information is received from a mobile station at the mobile switching center. The EIR is used to verify that the equipment number of the MS is certified for use in the public network and is not on the observation or service barred list.

Mobile switching centers are connected to other mobile switching centers, directly or via the public switched telephone network 128, to the public switched telephone network for accessing land-based customer stations and to integrated services digital network (ISDN) networks 126 for communicating according to the protocols of ISDN.

While the standards specify the functions of each of these blocks, they do not specify how each of these blocks is to be implemented. It is the purpose of this description to illustrate one arrangement for implementing these standards in an advantageous manner.

Figure 2:
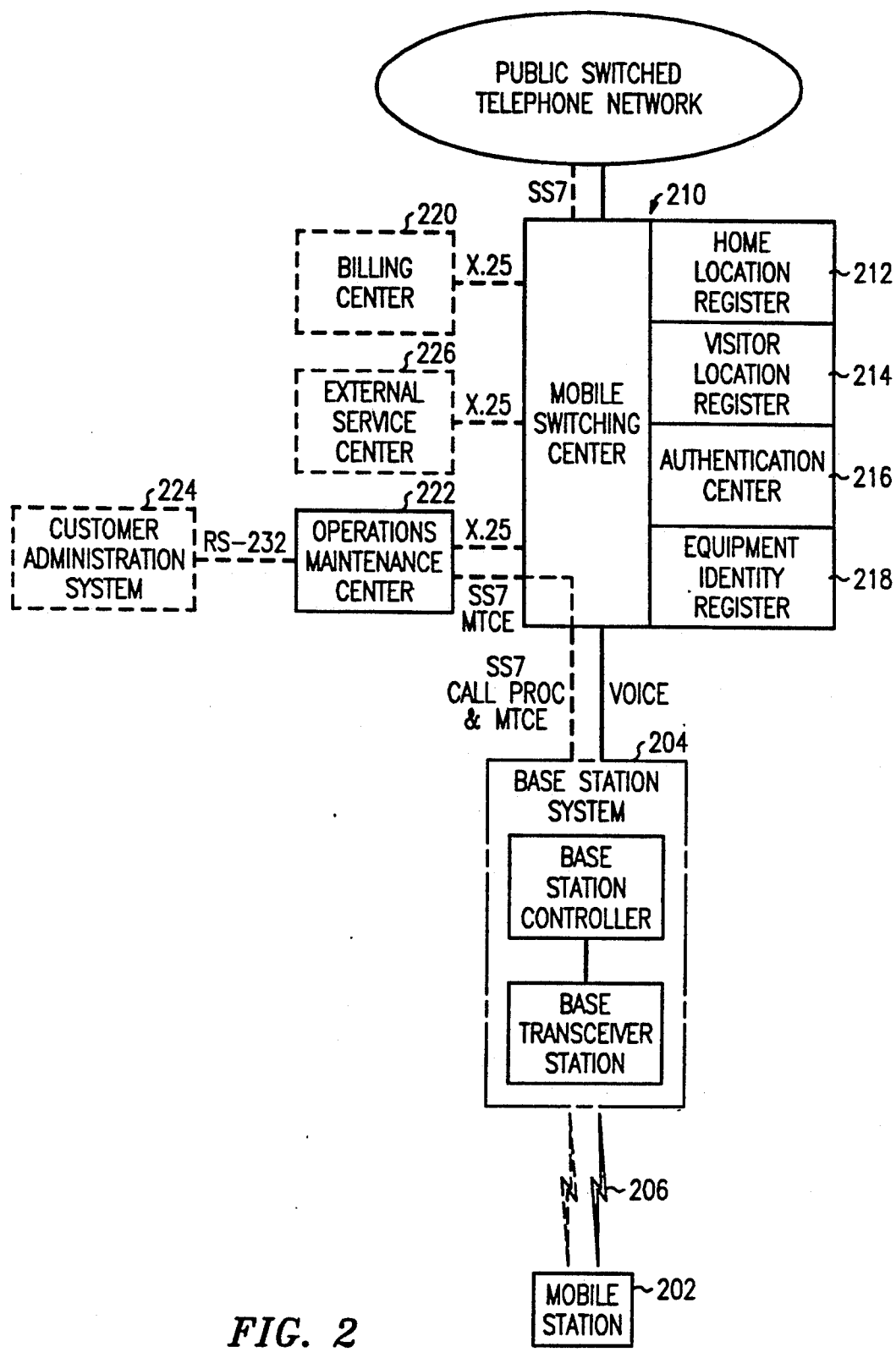
FIG. 2 illustrates how this model is implemented in one exemplary embodiment.

FIG. 2 illustrates the system architecture for implementing a GSM mobile communication system. The mobile station (MS) 202 communicates with the BSS 204 over radio links 206 using optionally encrypted digital radio communications for the voice or data, and control connections between the MS and the BSS. The MS communicates via the BSS with the mobile switching center (MSC) 210. The BSS and MS exchange control messages with the mobile switch center using the CCITT signaling system 7 protocol (SS7).

In this arrangement, the HLR 212, VLR 214, AUC 216 and EIR 218 records are all integrated into the MSC 210. When an MSC needs the HLR, VLR, AUC or EIR records from another network entity, it obtains them via SS7 messages transmitted to the entity that currently holds this information.

The MSC communicates with a billing center 220 for accumulating billing records using the CCITT X.25 protocol and also communicates with an Operations and Maintenance Center (OMC) 222 using the CCITT X.25 protocols. The OMC communicates with BSSs via the MSC using SS7. In one implementation, the OMC communicates with a customer administration system 224 using a standard RS-232 link. In addition, maintenance messages between the BSS and OMC are transmitted using SS7 with the Base Station System Operation Maintenance and Administration Part (BSSO-MAP) protocol.

Signaling System 7 is described in detail in A. R. Modarressi et al.: "Signaling System No. 7: A Tutorial," *IEEE Communications Magazine*, July 1990, pages 19-35. The GSM standard protocols are specified in the GSM standard specifications, which at this time is in version 3.8.

FIG. 3 is a diagram of the protocols used in different types of communications, according to the GSM standard. Most of these protocols are those of SS7. Of the seven layers of the protocol according to the International Standards Organization (ISO) layered message protocol, only the top (application layer) and the bottom three layers (Network, Data and Physical) are shown on the left. Four types of messages are shown: The first double column includes those from switching system to switching system for land-based trunks including either a telephone user part (TUP) or an ISDN user part (ISUP) (both SS7 standards) for the application layer. The second column is for messages among MSCs, VLR, HLR and EIR which messages use the SS7 standard Transaction Capabilities (TC), Transaction Capabilities Application Part (TCAP) and Mobile Application Part (MAP) sublayers of the application layer (MAP is enhanced with GSM standards). When these messages are strictly internal to the MSC, these protocols are simplified and messages transmitted directly or via protocol handlers between the responsible processors. The third column is for communications between the mobile switching center and a BSS. The final column is for communications between the mobile switching center and mobile station.

The three bottom sublayers of the protocol (layer 1, the physical layer, layer 2, the data layer, and sublayer 3, the message transport part (MTP) sublayer, a sublayer of the network layer) are identical for all of these types of communications and are in accordance with the SS7 Message Transport Part (MTP) standards of the CCITT Q.701-Q.707 standard. The Signaling Connection Control Part (SCCP), a sublayer of the network layer, also a CCITT standard Q.711-Q.714, is connection oriented for the MSC/MS communications, is connectionless for the second column, and may be either for the MSC/BSS communications. SCCP is available for some ISUP applications. For the first column (switch to switch) the TUP and ISUP application layer communicates directly with MTP 3 sublayer of the network layer.

Communications between the MSC and either the BSS or the mobile station use a Radio Subsystem (Base Station System) Application Part (BSSAP) protocol. For communications between the mobile switching center and the BSS, layer 7 uses the protocols of the BSSAP including a Base Station System Management Application Part (BSSMAP). The communications between the mobile switching center (MSC) and the mobile station are performed in the protocols of BSSAP including a Direct Transfer Application Part (DTAP). BSSAP, including BSSMAP and DTAP are GSM standards.

Figure 4:
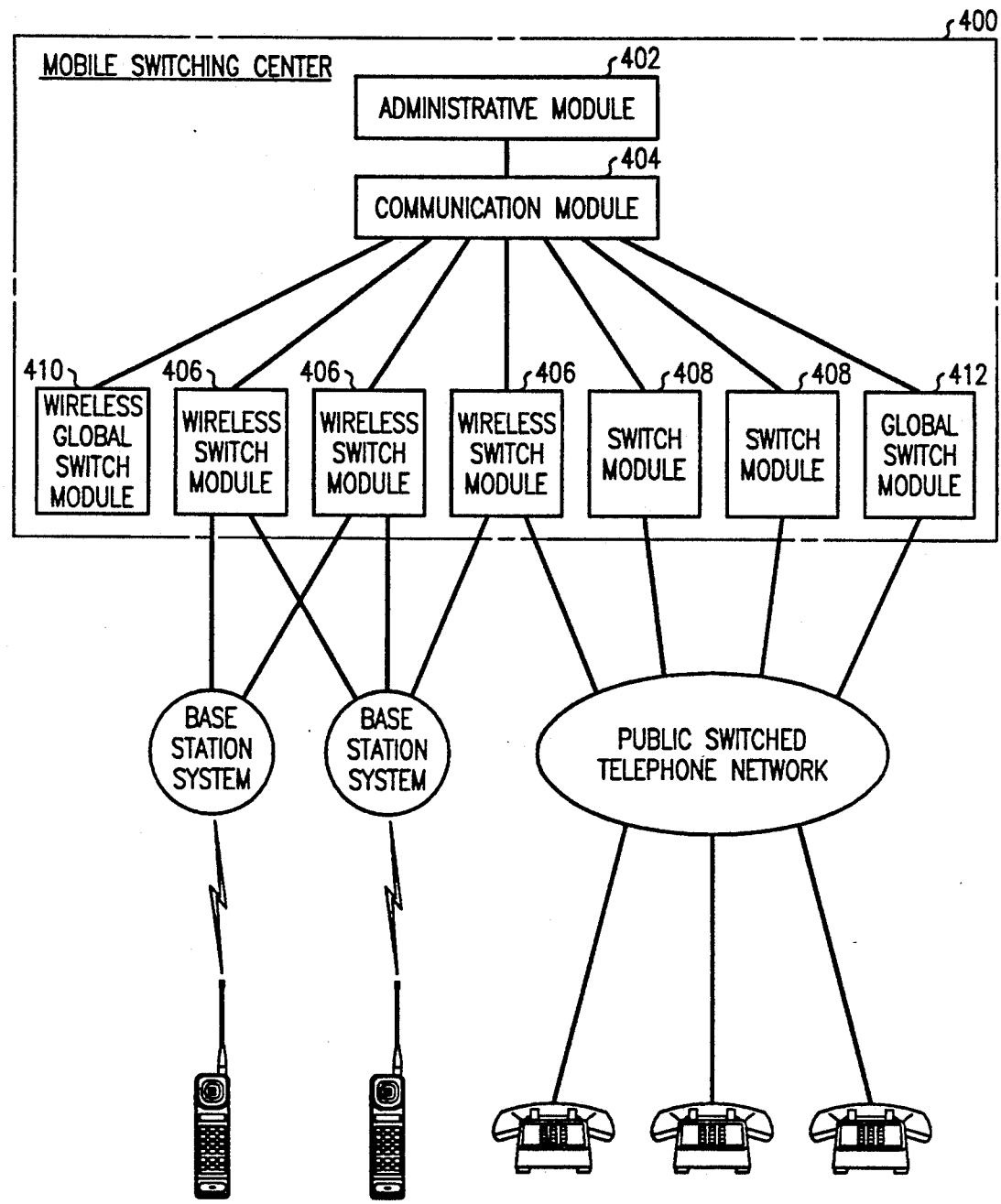
FIG. 4 illustrates the interconnections among mobile stations, landbased stations, base station systems, the public switched telephone network, and a mobile switching center.

FIG. 4 is a basic block diagram of a mobile switching center 400 (switch), as implemented using AT&T's 5ESS ® Switch. The switch, described in detail in *The AT&T Technical Journal*, vol. 64, no. 6, part 2, July/August 1985, pages 1305-1564, (Journal) includes an administrative module 402, a communication module 404, and a group of switching modules 406-412. The switching modules applicable in the GSM network are of four types; a wireless switching module (WSM) 406 for communicating with BSSs, and also optionally communicating with the public switched telephone network (PSTN); switching modules (SM) 408 for communicating with the PSTN; a wireless global switch module (WGSM) 410 for serving the signaling communication needs for controlling calls involving mobile stations; and a PSTN Global Switch Module (PSTN GSM) 412 used if PSTN trunks are of ISUP or TUP types, i.e., use SS7 for signaling to the PSTN. The PSTN GSM processes ISUP or TUP protocols and can optionally also be connected to PSTN trunks.

The functions of the administrative module (AM), communications module (CM) and switching module (SM), in relation to the PSTN are essentially as described in the referenced Journal. The purpose of the WGSM, as described hereinafter, is to simplify the signaling communications between BSSs and the WSM serving calls for the BSS, and between the MS and the WSM. The PSTN GSM is for controlling common channel signaling between the MSC and the PSTN. The PSTN GSM is connected by message delivery paths to protocol handlers in the SMs.

The signaling architecture of the mobile switching center is significantly simplified by having signaling messages go through a common set of data switches and protocol handlers in a wireless global switching module (WGSM). Physically, the wireless global switching module is connected via nailed up channels (message delivery paths) switched through the time multiplexed switch of the communications module to each of the wireless switching modules. These are 64 kilobit channels, the same as the PCM voice channels of the 5ESS switch communications module. Over another nailed up physical channel connecting the WGSM with a WSM messages are sent for a BSS via virtual channels in that physical channel; other virtual channels of that physical channel carry messages that originate from or are destined for the mobile stations.

The wireless switching modules (WSM) are combined packet and circuit switching modules each comprising a switching module processor (SMP), a packet switching unit (PSU) comprising a plurality of protocol handlers interconnected by a local area network, and circuit switching arrangements including a digital facility interface (DFI) and a time slot interchange unit (TSIU). The TSIU is connected to a time multiplexed switch of the communications module for interconnecting the switching modules. Switching modules comprising a packet switching unit are disclosed in M. W. Beckner et al.: U.S. Pat. No. 4,592,048.

Figure 5:
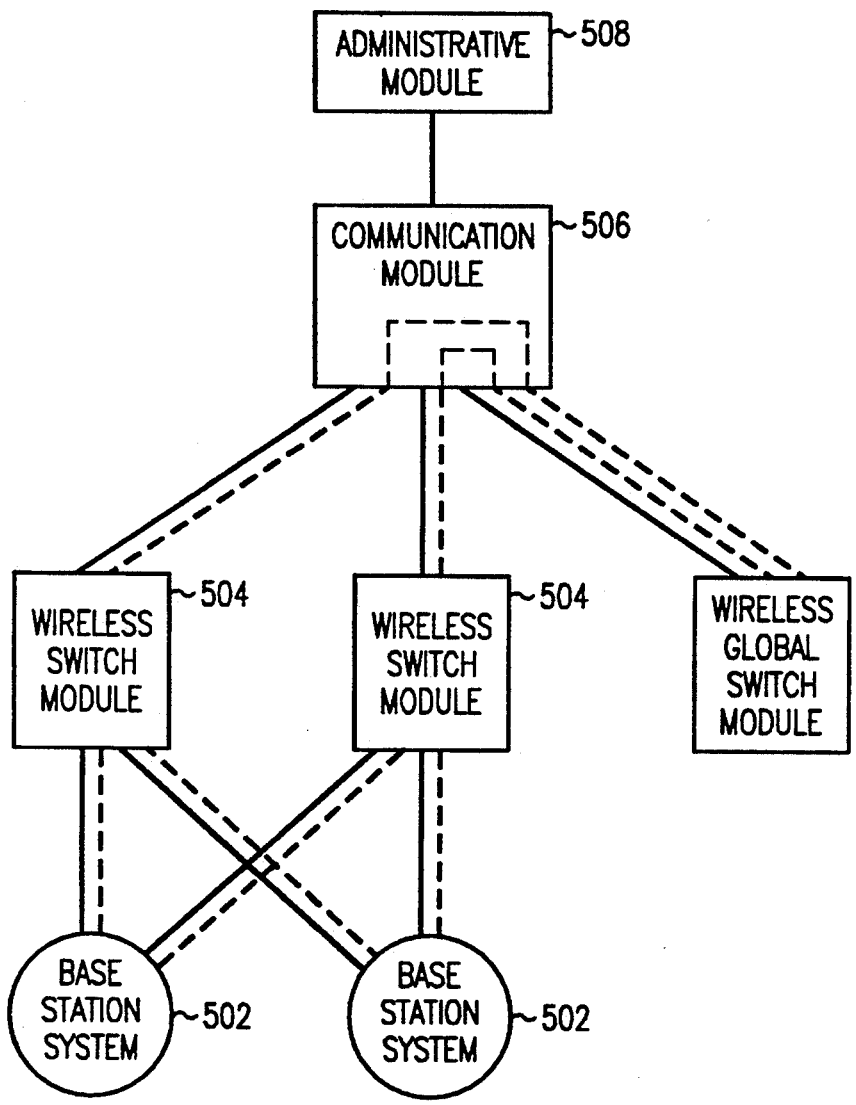
FIG. 5 illustrates the physical paths used for signaling and for voice or data interconnections.

The signaling paths between the BSS, WSM, and the wireless global switching module (WGSM) are as follows. Each base station is connected by digital carrier facilities to two or more of the wireless switch modules 504 (FIG. 5). Many of these digital facilities include one or more signaling channels, the signaling channels from each BSS being connected to at least two WSMs. The signaling channel is connected via the digital interface of this wireless switch module 504 into the TSIU of the wireless switch module and is thereby connected through the communication module 506 and to a protocol handler (PH) in the wireless global switch module. The wireless global switch module protocol handlers are interconnected via a local area network in the packet switch unit of the WGSM.

The portion of the signaling path between the WGSM and a destination wireless switch module is as follows. The WGSM has at least one protocol handler with a port for transmitting messages to and receiving messages from a specific wireless switch module. This port is connected to a message delivery path that passes via a nailed up connection through a time multiplexed switch of the communications module. Each such message delivery path is a 64 kilobit data link and is connected to a port of a protocol handler at each end. In case of a failure of a protocol handler at either end, spare protocol handlers can be used to replace the failed protocol handlers. The protocol handler in the wireless switch module communicates on its local area network side via a packet interface with a switching module processor of the WSM. This switching module processor performs call processing and generates or processes, for example, the BSSAP portion of a message between a WSM and a BSS. The message delivery paths and the physical signaling data links interconnecting a BSS and a wireless switch module carry a plurality of virtual data paths, usually, temporary virtual data paths (SCCP connections) associated either with a mobile call or a mobile service such as a location update.

These signaling arrangements have a number of advantages. By having at least two signaling data links between each base station and at least two wireless switch modules, redundancy is gained and operation can continue even if either of the signaling channels (including the protocol handlers at each end of a signaling channel) or a WSM fails. The use of a single wireless global switch module with inherent sparing of protocol handlers concentrates the translation information required to select a destination wireless switch module when, for example, VLR data for a particular customer, as identified by that customer's International Mobile Subscriber Identification (IMSI) is required. Failure of one or more of the protocol Subscriber Identification (IMSI) is required. Failure of one or more of the protocol handlers in the WGSM can be overcome by replacing a failed protocol handler with a working spare and by properly initializing that protocol handler to take over the functions of a failed protocol handler. Local reference numbers, discussed hereinafter are used to identify SCCP connections. As described hereinafter because key information is stored in the local reference numbers, and because duplicate records are maintained on all stable SCCP connections through protocol handlers of the WGSM, none of these connections are lost even though they may have been served by a failed protocol handler.

The WGSM has at least one spare protocol handler per shelf of a PSU. In the event of a failure of any protocol handler, a spare takes its place. If no redundant data were available, then in the event of a simplex failure in a protocol handler the dynamic data regarding SCCP connections would be lost and consequently all BSSAP calls switched through that protocol handler would be lost. Redundancy of this data is added to the software architecture to ensure the integrity of this connection data.

When a connection is set up between a mobile switching center and a BSS, a local connection identifier is associated with each distinct connection. In order to keep each instance of the connection coordinated between the MSC and the BSS, this connection information is shared through the use of SCCP local reference numbers. According to the CCITT SS7 protocol, each end will send its local reference number and the far end's local reference number when first confirming the setup of a valid connection. Subsequent dialog requires the sending of the far end's local reference number. The value of this local number is not constricted by standards. When a connection is first initiated in the mobile switching center, the local reference number is encoded to include a connection identifier and the number of the protocol handler on which the connection resides.

The MTP layer provides for load sharing on a data link, changeover and changeback, with the possible result that incoming messages for a connection may arrive on a different physical link than messages being sent. When this occurs, the SCCP message arriving in a different protocol handler is routed to the proper protocol handler by decoding the local reference number since that quantity contains the identification of the protocol handler (PH) upon which the connection resides.

Whenever a SCCP connection goes into an active (stable) state, this connection information is shared with the next ascending PH in the PSU community (wherein the first PH is the "next ascending" PH for the last PH). This "next ascending" PH is known as a "backup PH." When a PH fails, a spare PH is switched into its position and thereby connected to the sources and destinations of messages for that PH. The "next ascending" PH transmits to the spare PH a list of reference numbers of stable connections from the failed PH; the "next ascending" PH will continue to control these connections as long as they are active. The spare PH assigns local reference numbers for new connections that have the same logical PH number as the connections formerly served by the failed PH. When the spare PH receives a message for an active connection, it first checks to see whether the reference number is one of a connection controlled by the "next ascending" PH. If so, the spare PH transmits that message to the "next ascending" PH which has the information for processing that message, and which therefore can maintain the virtual connection. In this way in the event that a PH fails, messages received on existing SCCP connections for the failed PH are automatically routed to the "next ascending" or backup PH. When a PH fails, the backup PH will automatically restart timers associated with the SCCP connections from this backup information. In this way, stable connections will remain stable as will calls dependent on those connections. Every PH, that sets up SCCP connections, has a dedicated backup PH. Since a spare PH then assumes the logical role and name of the failed PH and accepts new SCCP message connection requests for that PH, this will gradually reduce the temporary overload on the backup PH. When the failed PH is eventually restored to service, it then takes the role of a spare PH.

While in this embodiment, the "next ascending" PH is used as a backup, any other predetermined backup arrangement, such as the "next ascending skipping 1" (in a system with an even number of active PHs) could be used instead. The term "predetermined adjacent" is used to describe any predetermined backup PH selection.

As discussed above, when the spare PH assumes the role of the failed PH, the backup PH will report the present status of all its active connections to the spare PH. The spare PH will not reuse resources, such as connection identifier numbers, for active connections still running on the backup PH when setting up new SCCP connections. The backup PH will then continue to service all presently active connections until they are released, as well as servicing new SCCP connections for itself.

When a mobile station is first powered up within a specified mobile network, the international mobile subscriber identification (IMSI) is used by the mobile station to identify itself. This IMSI is used to route a request for VLR data to the WSM that contains that data. Each protocol handler of the WGSM contains a table that stores the IMSI-WSM map, the table being created from data supplied by the WSMs. In order to allow HLR and, where possible, associated VLR records to be stored in any WSM, this look-up table has one entry per IMSI. During the location update or registration process, the SM that stores the VLR data will associate a Temporary Mobile Subscriber Identification (TMSI) with a mobile station. The TMSI, whose value, while at least in part random, is not otherwise constricted according to the GSM standard, is specially encoded with the identity of the WSM (i.e., a switching module having wireless software) that contains the VLR so that accessing the proper WSM for incoming messages when VLR data is required is simplified if the TMSI is available. Randomness of the TMSI is maintained by randomizing three of its four octets. Except on initial mobile station power up, as described above, the TMSI will normally be used for all BSSAP transactions. When a mobile station initiates a transaction (such as a call or location update), the SCCP connection data base that stores information about the transaction, also stores information to identify the WSM that contains VLR data as well as the WSM that contains the trunk connected to the BSS. This is used for the routing of all subsequent messages for this connection, which contain no TMSI.

As an example of the operation of the signaling system, consider a data connection between a BSS and a mobile switching center. Assume that the connection is initiated in the BSS. An initial message would first be transported by MTP in the BSS from the BSS over a signaling data link logically interconnecting the BSS and a WGSM. The protocol handler, in the wireless global switch module, which terminates the signaling data link passes the message from MTP to a SCCP control program. This SCCP program strips off the MTP header and parses the message. Depending on the contents of the message, a connection is established or released, or the transfer of data is required. In this example, connection establishment is requested and a SCCP connection (i.e., a virtual circuit) is temporarily set up between the protocol handler in the WGSM end of the signaling data link and the protocol handler in the BSS. The SCCP control program informs a base station system application part (BSSAP) (also referred to as a radio subsystem application part in FIG. 3) of the request for a connection establishment via a primitive interface. BSSAP then parses the BSSAP message and obtains the identify of the destination wireless switch module. In the case, for example, of a query requiring VLR data, this destination WSM is identified by the international mobile subscriber identity (IMSI) field contained in the BSSAP message. The BSSAP control process uses the IMSI to index a look-up table to find the WSM where the VLR data base for this IMSI is to be found. The message is then sent within the WGSM from the protocol handler terminating the signaling data link to a protocol handler that terminates a message delivery path to the identified WSM. This protocol handler then sends the message to a protocol handler on the destination WSM which in turn forwards the message to the switching module processor of that WSM. A BSSAP control process in the destination WSM then further parses the message and passes it on to a call processing program for processing a mobile call or service.

Another example of the signaling procedures carried out in this embodiment of the invention is the procedure for sending a message from a wireless switch module to a BSS via an established connection. In the transmitting wireless switch module, a BSSAP process assembles a BSSAP layer of the message that is tagged with the local reference number identifying the SCCP connection. This process then forwards the message to a protocol handler in the source wireless switch module, which then transmits the message over a nailed up message delivery path going through the communications module to a first protocol handler in the wireless global switch module. This first protocol handler examines the local reference number of the message and uses this to determine the second protocol handler that terminates the SCCP connection. (This local reference number was previously derived during the process of establishing the SCCP connection.) This protocol handler then uses a SCCP process to encapsulate the message with a SCCP header and passes the message to a message transport part (MTP) process for adding the MTP headers. The message is then sent over the (logical) data link to the BSS. (The physical data link corresponding to this logical data link has been described earlier.)

Advantageously, this type of arrangement permits essentially all of the SS7 protocol handling functions to be carried out in the packet switching unit of the WGSM (without involving the switching module processor of the WGSM) and allows the transmitting and receiving WSMs to process their messages independent of the destination. Effectively, the set of protocol handlers of the packet switch unit of the WGSM acts as the handler of all signaling protocols. (A maximally equipped WGSM contains 75 active and 5 spare protocol handlers.) The WGSM assembles and disassembles the Signaling System 7 headers to the application data of the messages and switches the messages for transmission to the proper WSM which may either accept the messages (if the destination is the mobile switching center) or originates messages to the appropriate BSS (if the destination is either a BSS or a mobile station).

In addition, the MSC communicates from the administrative module with an external service center 224, using the X.25 protocol for delivery of short messages, such as an indication of a voice message waiting. The MSC communicates with the public switched telephone network using a land-based signaling system such as SS7.

The switching modules also communicate messages via the message switch of the communication module as is done in a land-based 5ESS switch. Call processing messages, such as the messages that are exchanged in order to set up a connection through the communications module between, for example, a switching module connected to the public switched telephone network portion of a land-to-mobile or mobile-to-land call and the wireless switching module that is connected via the BSS to the mobile station end of the call, are sent in this way.

Whenever an MS is in the region served by its home MSC, i.e., the MSC that contains the HLR for that MS, the base VLR is attached to the HLR in such a way that common data is stored only once for the two registers; the VLR and HLR are then stored in the same module.

When the mobile station is either in the power-off state or in the power-on state but not in any active call state, only a base version of the VLR is maintained for that mobile station in the VLR WSM. When a call is originated by a mobile station or a call is received for that mobile station, a separate dynamic version of part of the VLR is stored and maintained in the WSM that controls the mobile calls. This copy of the VLR is linked to the terminal process in that WSM that controls the mobile station end of the call. If the mobile station moves and the call is handed over to a different switching module, then the dynamic copy of the VLR is transferred to the new WSM serving the mobile station for that call and is linked to a terminal process for serving that call in that WSM. Note that the data in the base VLR that is not relevant to the MS locations is changed only by administrative actions or such customer programming actions as the specification of a call forwarding number and are not copied into the dynamic VLR. When necessary, the system administrator modifies the HLR which in turn updates the base VLR; the administrator has "read only" access to the base VLR for trouble shooting purposes.

The location of the mobile station is not updated in either the dynamic or the base VLR during a call, and is updated in the base VLR only as part of a location update procedure. Location update procedures are carried out when the mobile station is idle with power on, and moves from one location area to another. A location area is the area that is paged when a call terminating to an MS is received.

All incoming calls first check the HLR. This is because the HLR is fixed and the location of the HLR record is tied to the called number (directory number) of a mobile station. The HLR has stored within it the information necessary to find the base VLR; this information includes an identification of the mobile switching center that contains the base VLR. For this detailed description, this MSC is the same as the MSC of the HLR, and the HLR and VLR are stored as one block so that if either is located the other is also located. All administrative changes of data associated with a mobile station are entered first into the HLR which then sends messages for entering the corresponding change in the base VLR. Customer initiated changes such as the prescription of a different call forwarding number are forwarded initially to the base VLR which does not initially make any change in its record but forwards the request to the HLR which makes the necessary change and generates a message for updating the base VLR. The HLR is accessible via the mobile station directory number or the International Mobile Subscriber Identification (IMSI). The VLR is accessible via the IMSI or the TMSI; the HLR can also access the VLR by a special ISDN address. ISDN addresses are maintained for VLRs, HLRs, MSCs, and EIRs according to the GSM specification.

The VLR is attached to the HLR so that common data need only be stored once. This arrangement is satisfactory as long as the mobile station is in the region served by the MSC; consideration of the storage of the VLR when the mobile station leaves that region is beyond the scope of this description.

The combined HLR and VLR is stored in the wireless switching modules of the MSC. Each switching module stores records for a range of mobile directory numbers and each module has a range translation to select a module based on the directory number. Since the HLR/VLR must also be accessible via the IMSI, a table is stored in each protocol handler of the WGSM to identify the module that has stored the VLR/HLR for each IMSI served by the MSC. No translation is required for access via the TMSI since that contains a subfield for identifying the VLR/HLR modules.

FIG. 5 is a block diagram illustrating the physical signaling paths between base stations and wireless switching modules. The base stations 502 are connected through permanent virtual circuits which physically pass through a WSM 504 serving the base station and through the communications module 506 to a protocol handler in the WGSM 508. The protocol handler receives messages in the SS7 protocol used to communicate with the base station and transmits the message to the correct WSM; the digital facility interface connected to the BSS transmits the messages to a protocol handler of the WGSM which is connected by a switchable physical nailed up data channel to the destination WSM, where it terminates on a protocol handler which is connected to the switching module processor of the WSM. Advantageously, the WGSM terminates a standard protocol and allows any WSM to control any calls from the base stations that have trunks to the WSM, since the processor of the switching module (SMP) for controlling the call need not be the SMP for controlling a specific connection between a BSS trunk and a channel to a CM or to another output of the WSM.

Figure 6:
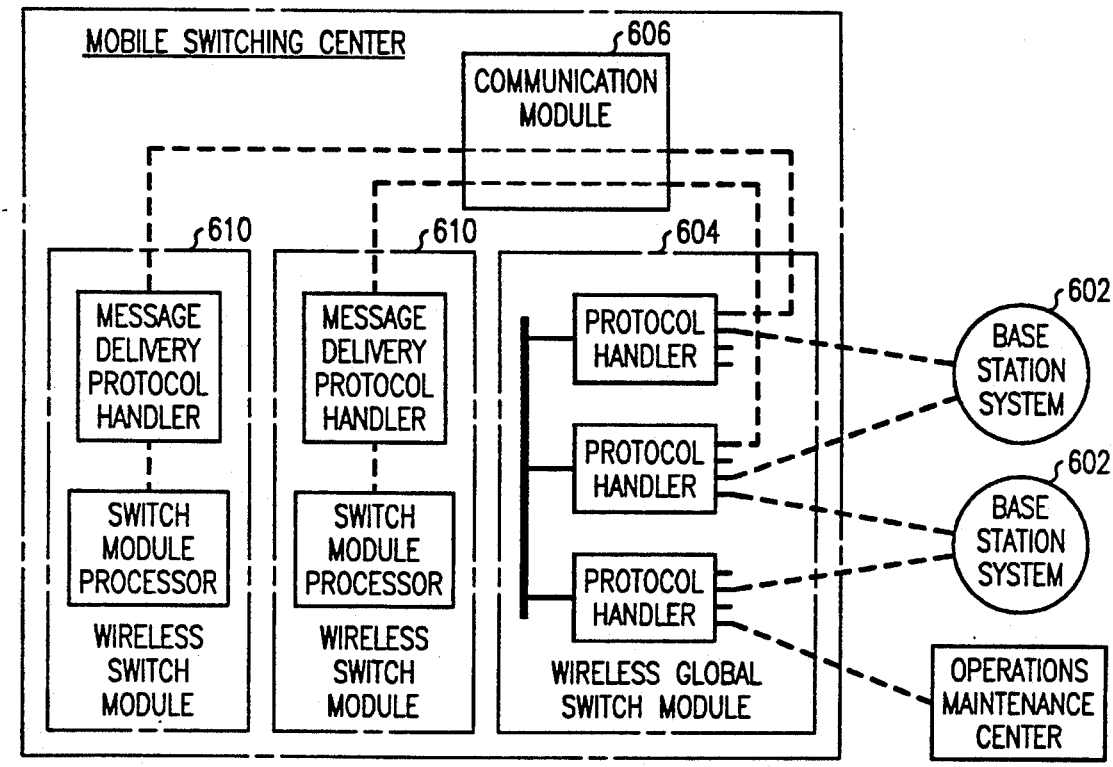
FIGS. 6-8 illustrates the signaling interconnections including the role of the wireless global switch module (WGSM)

FIG. 6 shows the logical signaling system. The base station system 602 communicates with the WGSM 604 which then delivers its message via the communications module 506 to the appropriate WSM 610.

Figure 7:
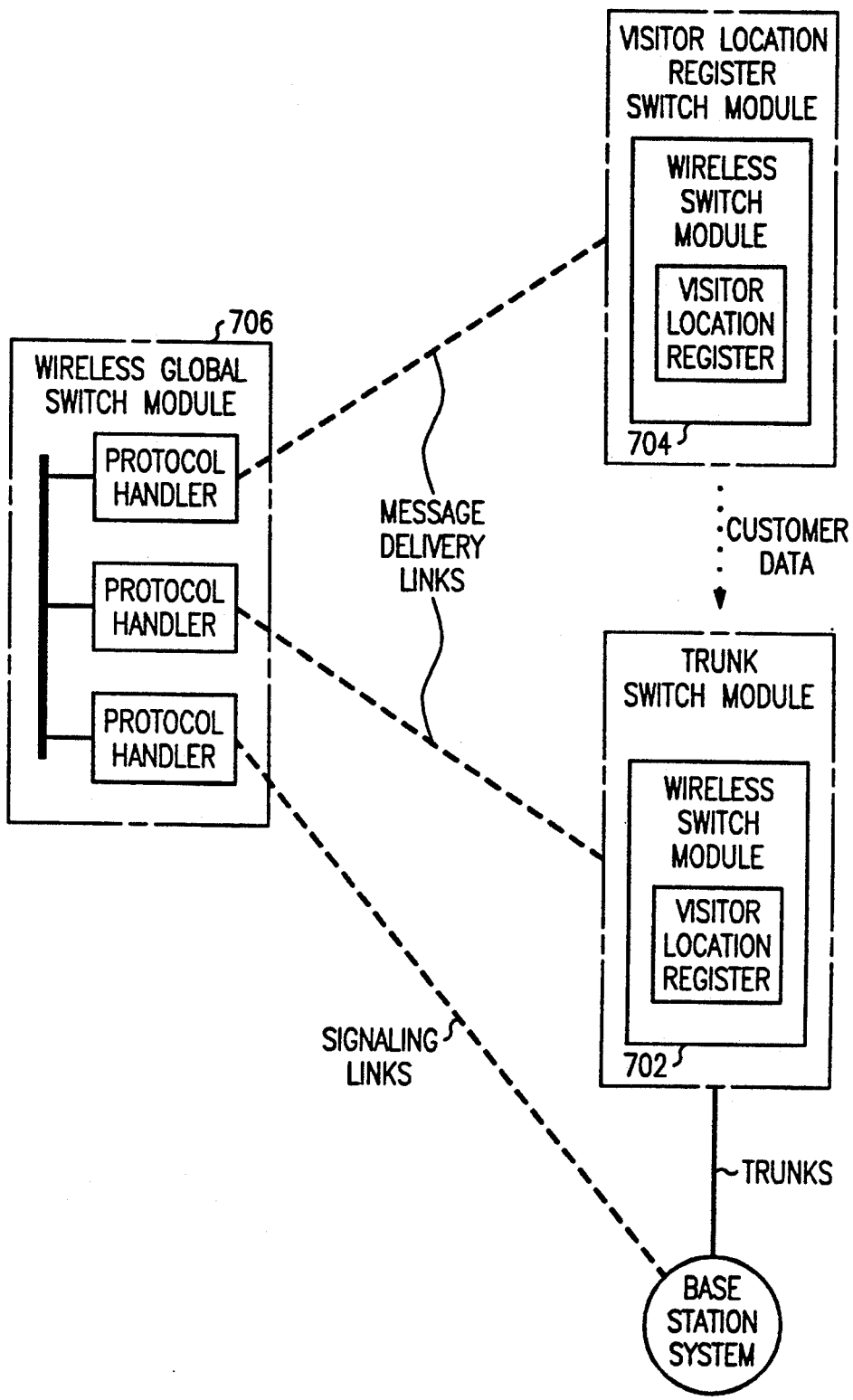

As shown in FIG. 7, the VLR data for a particular mobile switching center is spread out over the WSMs 702, . . . , 704 in that center. In thw particular example, when WSM 702 needs VLR information from WSM 704, it requests the information via the call processing inter-module data links switched through the message switch of the communications modules of the 5ESS switch.

Figure 8:
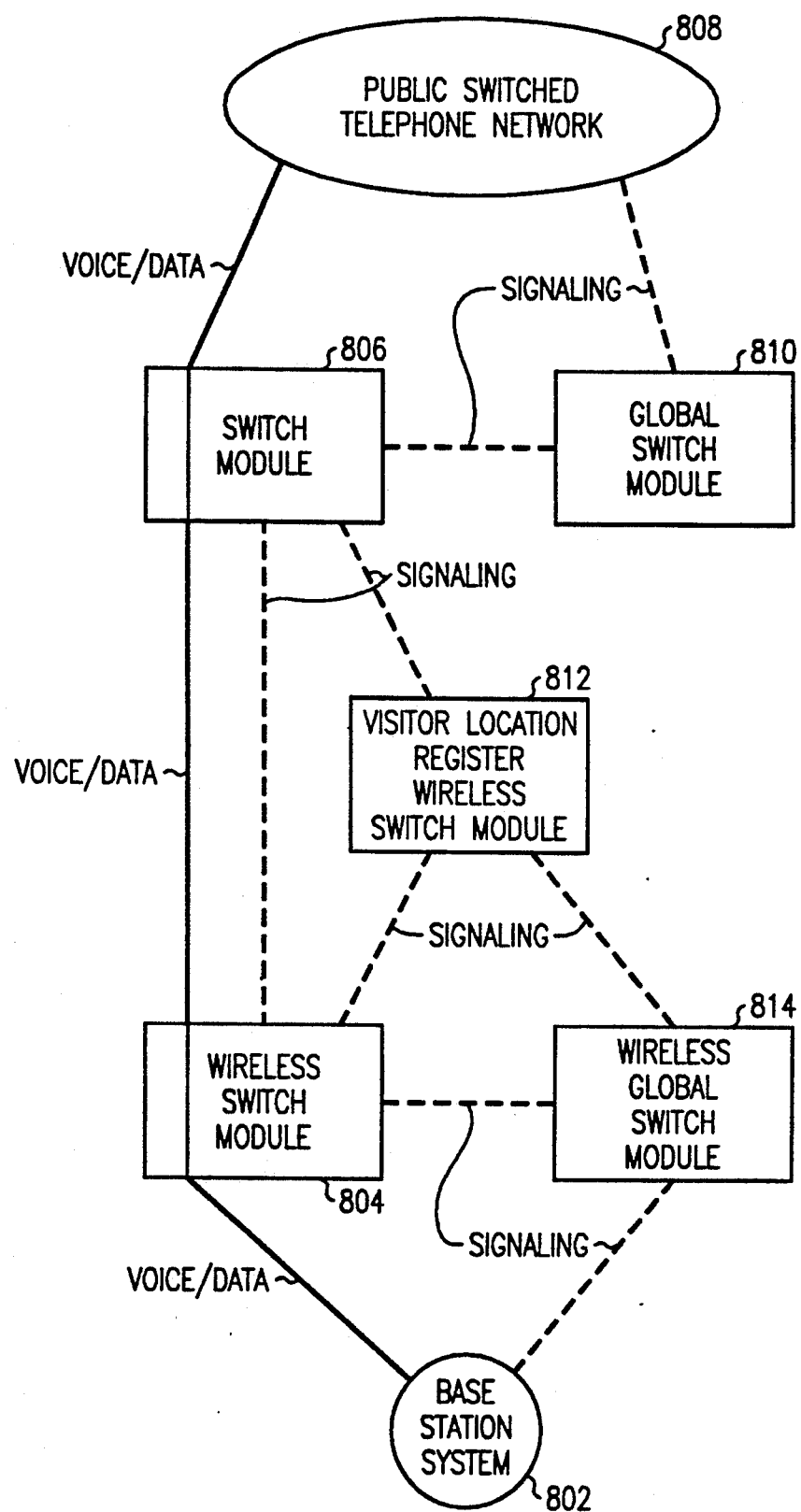
Figure 9:
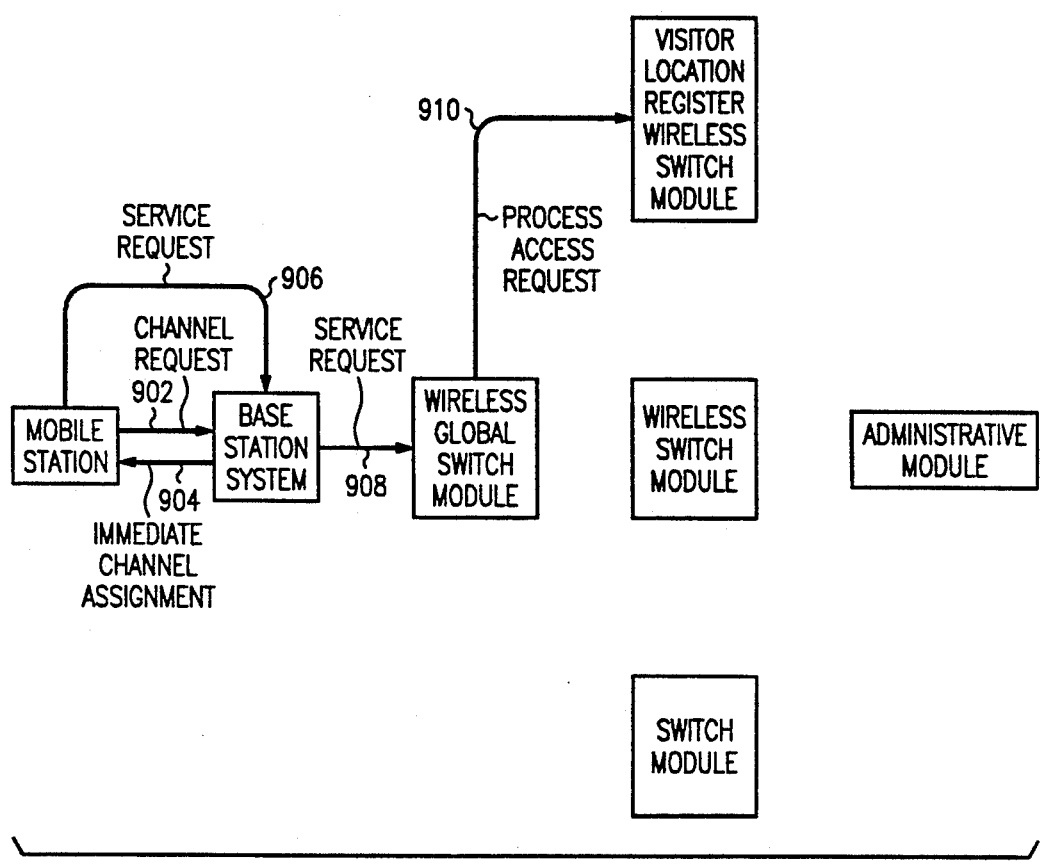
FIGS. 9-13 illustrate the process of establishing a mobile to land call.
Figure 10:
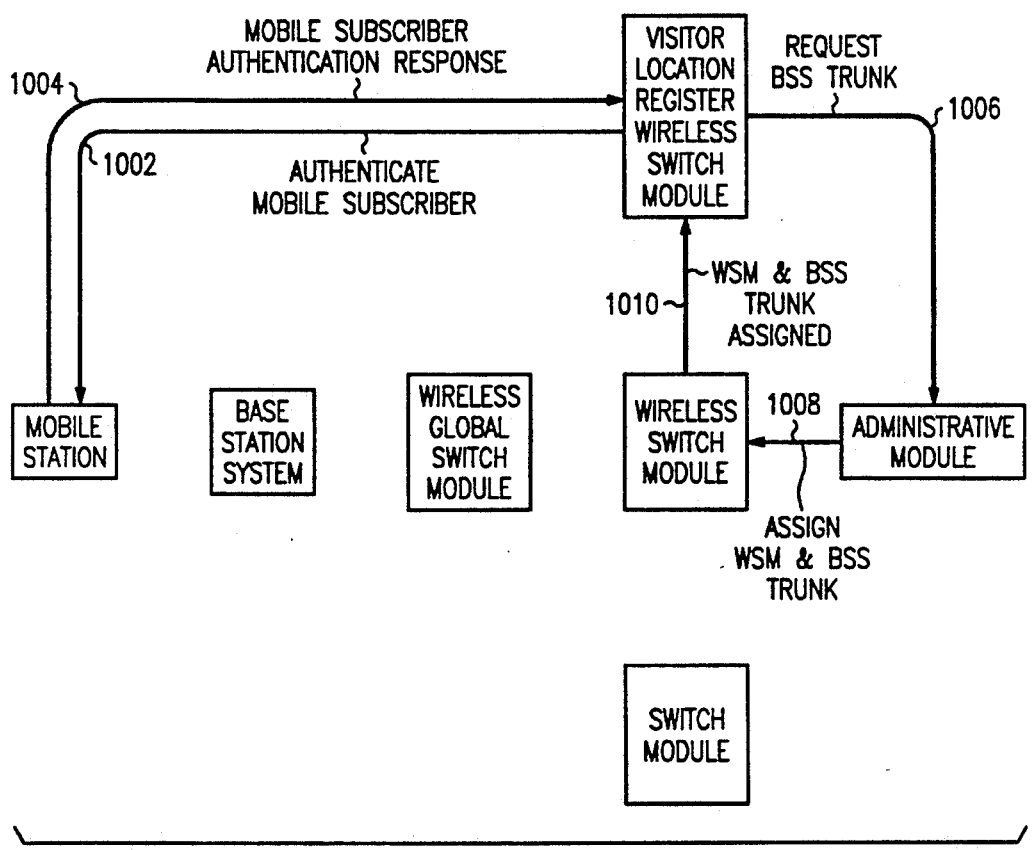
Figure 11:
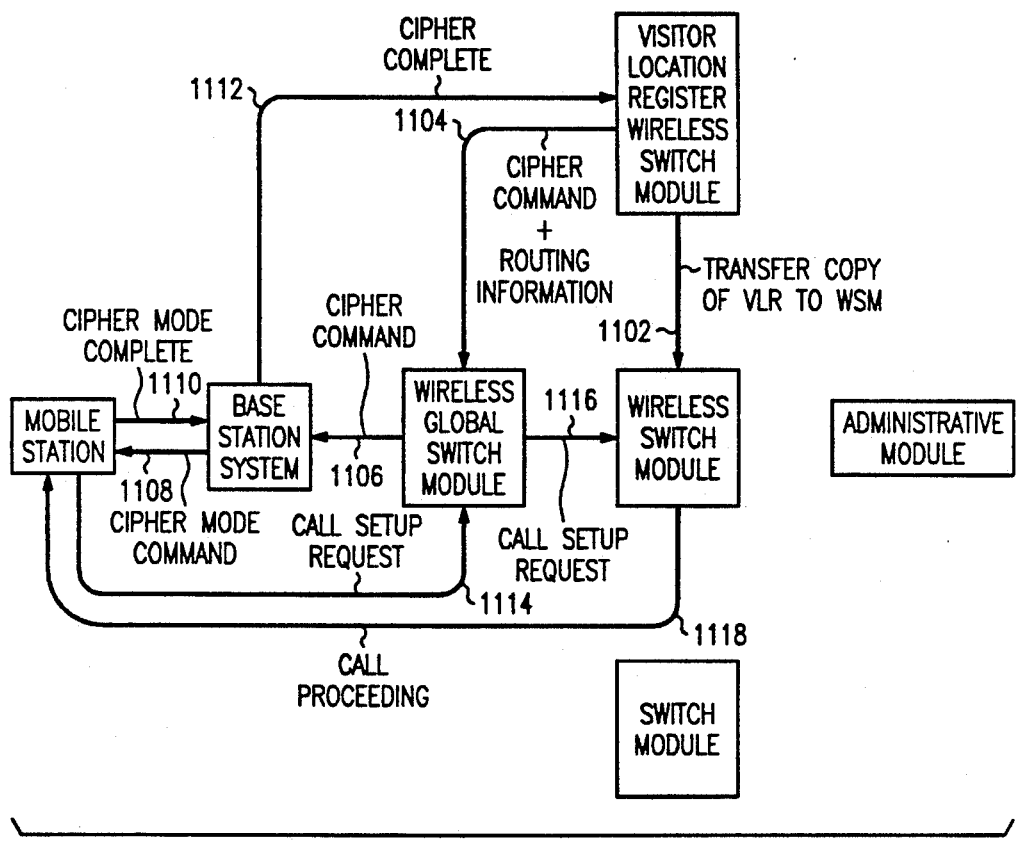
Figure 12:
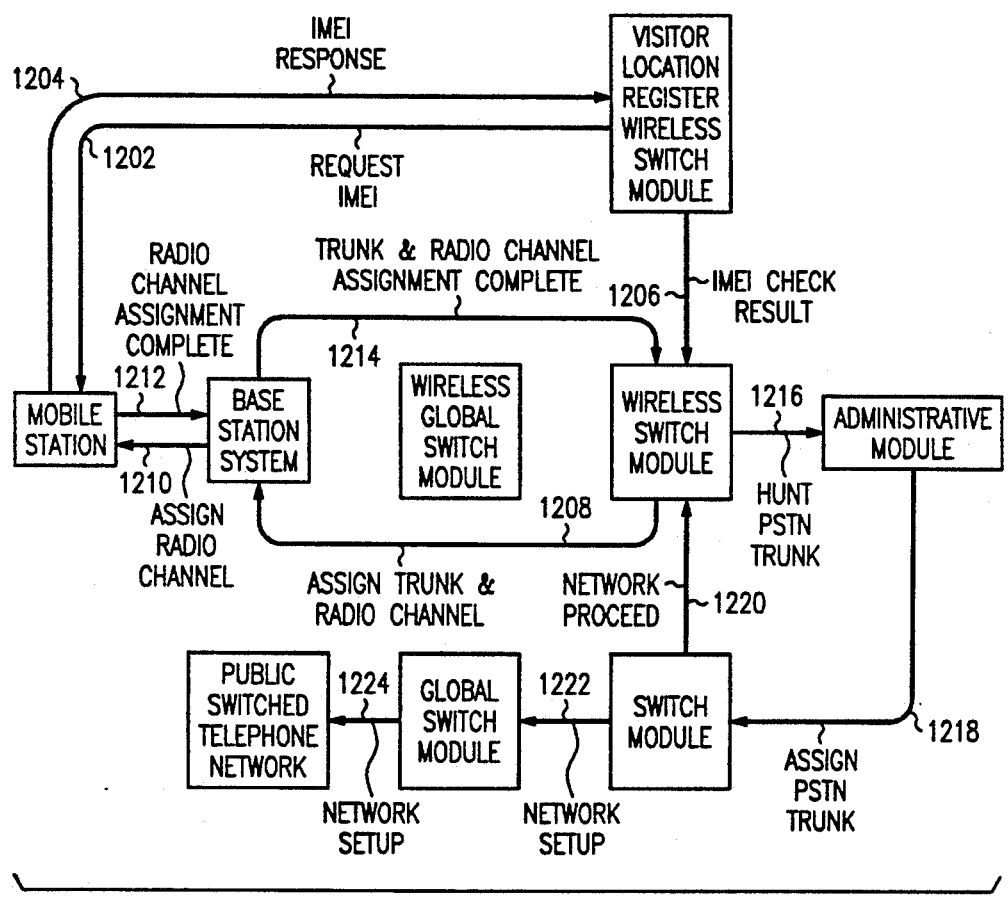
Figure 13:
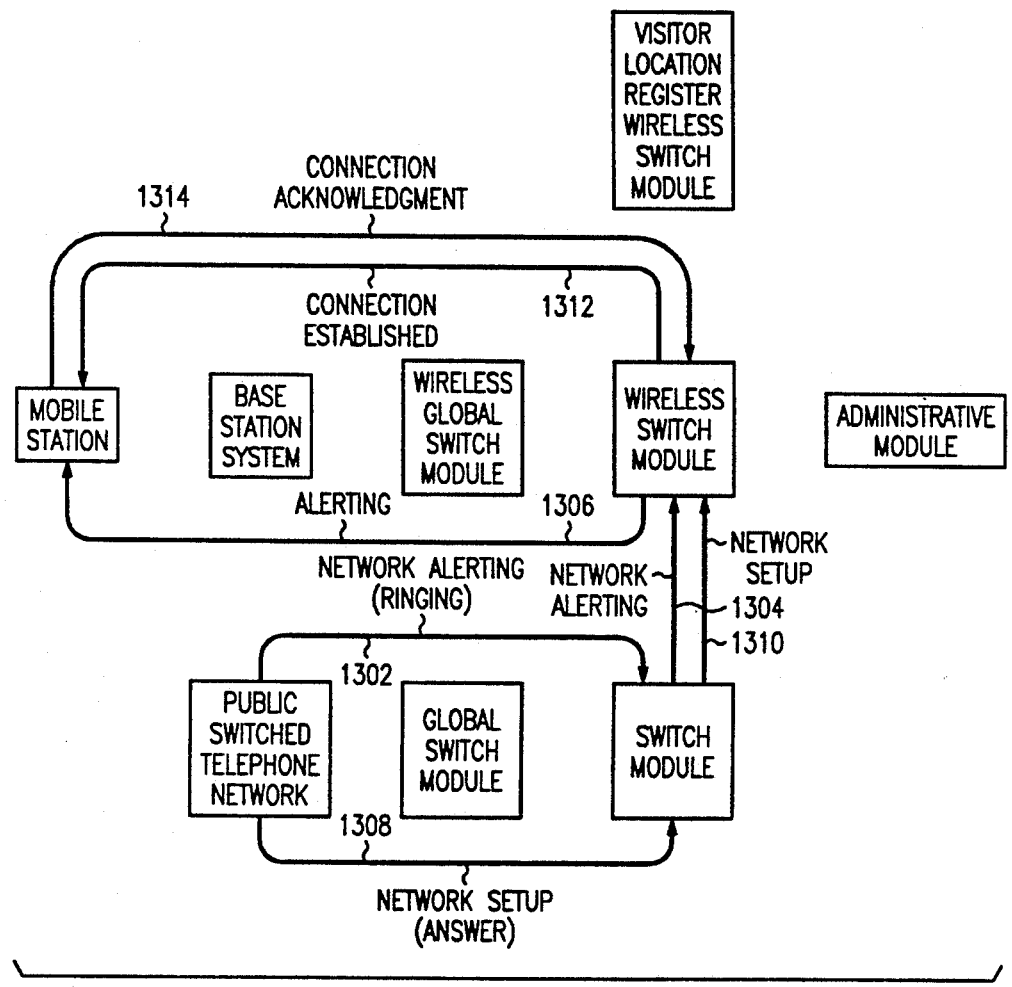

FIG. 8 illustrates the modules involved in a mobile-to-land call. The base station system 802 nearest the mobile is connected by a voice path to a wireless switching module (WSM) 804 which is connectable through the communication module (CM) to another switching module for connection via the public switched telephone network (PSTN) 808 to the called customer. The PSTN global switching module (GSM) 810 is used for controlling SS7 signaling to the public switched telephone network. The WSM 812 that contains the base VLR data is connected via virtual data links to the WSM 804 controlling the mobile station leg of the call. The SM 806 and WSM 804 are connected by a virtual data link in order to coordinate the activities of the terminal process handling the call in each of these modules. The WGSM 814 communicates all data to and from the BSS and transmits it as necessary to either the WSM 804 or the VLR-WSM 812.

Consistent with the principles of operation of the 5ESS switch for land-based calls, the administrative module 508 (FIG. 5) is used for selecting outgoing PSTN trunks on mobile originated calls and for selecting time slots for voice paths between switching modules. In addition, the administrative module is used for selecting trunk between the mobile switching center and a base station controller. The base station controller selects a path between the incoming trunk to the base station controller and the base transceiver station. As previously indicated, this path may be a land-based trunk. The trunks between the BSSs and the mobile switching center are one way outgoing from the mobile switching center. This makes the finding of an idle trunk from the centralized administrative module efficient and allows the trunks to be fully utilized: whether the call is originated by a mobile station or is terminated to a mobile station, the trunk will be hunted for and allocated by the administrative module which is a part of the mobile switching center.

FIGS. 9-13 illustrate the messages required in processing a mobile-to-land call and shows the source and destination of each message. The call is initiated by a control channel request message 902 (FIG. 9) from the MS to the BSS to request the assignment of a dedicated control channel for further signaling from the MS. The BSS responds with a control channel assignment message 904 to allow the MS to access the proper control channel. The MS then transmits a service request message 906 to the BSS which passes this service request message 908 to the WGSM. The WGSM transmits a process access request message 910 to the WSM that contains the VLR information. The WGSM has the data for determining which WSM contains the VLR information for this mobile station. This data is used when the TMSI is not available. If the TMSI is available, it has the VLR-WSM ID encoded in it for easy identification of the VLR-WSM. The message from the WGSM to the VLR-WSM is for processing the service request and for creating the connection data in the VLR-WSM for the request. The VLR-WSM enters a tuple in the connection data block for the process that handles the request. The data includes the identification of the connection transaction using the connection. An authentication process, if needed, is initiated by the VLR-WSM, which transmits a message 1002 (FIG. 10) to the mobile station (the message is actually transmitted via the WGSM, the WSM connected to the BSS, and the BSS) to request authentication algorithm calculation. The mobile station responds to the VLR-WSM with a message 1004 containing the result of the authentication algorithm calculation.

Meanwhile, the VLR-WSM transmits a message 1006 to the administrative module (AM) requesting the assignment of a BSS trunk for the call and the AM transmits a message 1008 to the WSM connected to that trunk for creating a wireless originating terminal process in that WSM for handling the call. The WSM then returns a message 1010 to the VLR-WSM for notifying the VLR-WSM which trunk WSM (i.e., WSM connected to the trunk to the BSS serving the call) and BSS trunk has been assigned to the call. As will be seen below, the VLR-WSM is required for controlling the ciphering information for the call.

If ciphering is used, the VLR-WSM transfers (message 1102, FIG. 11) to the WSM for handling the call, a copy of the call processing related information, relating to the mobile station from the VLR record to the call controlling WSM. If ciphering is used, the VLR-WSM transfers the cipher command to the BSS via the WGSM (messages 1104 and 1106). The BSS transmits a cipher mode command (message 1108) to the mobile station. The mobile station then sets up the cipher mode and transmits back to the BSS, a cipher mode completed message 1110. The BSS sends a message to the VLR-WSM that the cipher process has been completed 1112. At this time, both the BSS and the mobile station are in a corresponding cipher mode. The details of the encipherment are specified in the GSM standard.

The mobile station then sends a setup request message (1114 and 1116) via the WGSM to the call controlling WSM (i.e., the WSM that contains the terminal process for the mobile station). The WGSM had previously been informed of the identity of the WSM in message 1104. The WGSM checks to ensure that no failures have been encountered up to this time before call setup request. If any failures have occurred, the failures are reported to the WSM. The WSM then transmits a message 1118 to the mobile station indicating that the call is proceeding.

Next, if the equipment validation function is needed, the VLR-WSM in cooperation with the call controlling WSM and the mobile station performs that function. (Equipment validation is optional in GSM according to the wishes of the telecommunications operator.) The VLR-WSM requests (message 1202) the mobile station to furnish its International Mobile Equipment Identification (IMEI). The mobile station responds with its IMEI (message 1204) to the VLR-WSM which checks to insure that the mobile station is authorized to use the network. The VLR-WSM sends the result of its check (message 1206) to the call controlling WSM. Meanwhile the trunk WSM notifies the BSS of the identity of the previously assigned BSS trunk (message 1208). The WSM also requests that the BSS pick a radio channel for the voice (or data) communication with the mobile station. This radio channel will then be associated with the assigned BSS trunk for the length of the call or until the call is handed over to another BSS or terminated. The BSS assigns the radio channel and notifies the mobile station of the assignment (message 1210). The mobile station responds (message 1212) when it has received this assignment and has tuned its radio to that channel. The BSS then reports back to the WSM that the radio channel assignment process and the radio to trunk connection have been completed (message 1214). The WSM requests (message 1216) the administrative module to hunt for a trunk to the public switched telephone network for completing the land part of the call and the administrative module assigns this trunk and requests the switching module connected to that trunk to create a terminal process for the call (message 1218). The switching module then transmits a message 1220 to the WSM that the network connection is proceeding and transmits a message 1222 to the PSTN GSM which transmits message 1224 to the public switched telephone network to set up the call. (This is a TUP or ISUP message depending on the type of trunk signaling used to access the next switching system of the PSTN.)

The public switched telephone network then responds to the SM with a message 1302 (FIG. 13) indicating that the called customer is being alerted and the SM transmits a message 1304 to the WSM which sends a message 1306 to the mobile station to connect alerting tone. (This is supplied locally within the mobile station.)

Sometime later, the public switched telephone network sends message 1308 to the SM that the called customer has answered. The SM sends a message 1310 to the call control WSM to indicate that an end-to-end talking path has been established. The call control WSM so informs the mobile station (message 1312). The mobile station responds with an acknowledgment (message 1314) and the call is now active.

Figure 14:
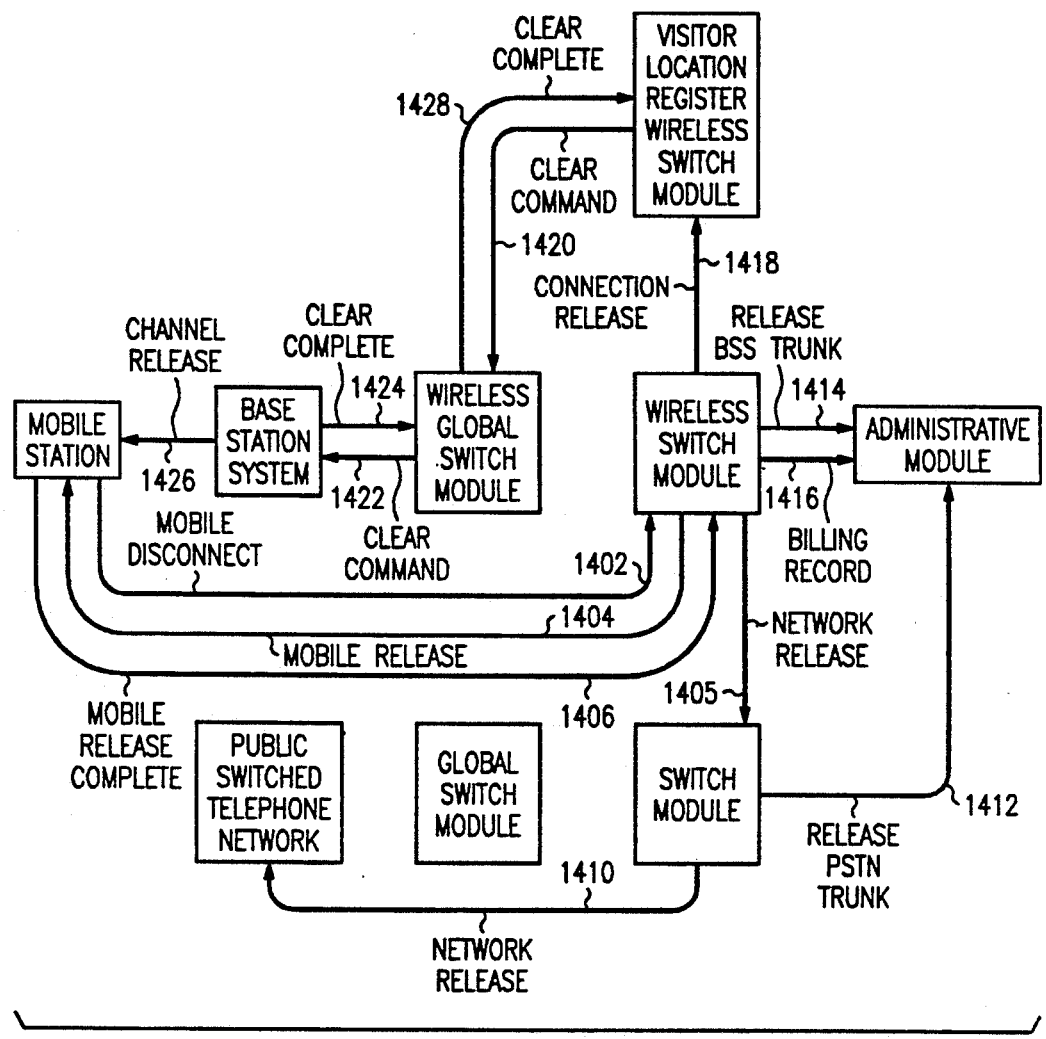
FIG. 14 illustrates the release of a mobile call.
Figure 15:
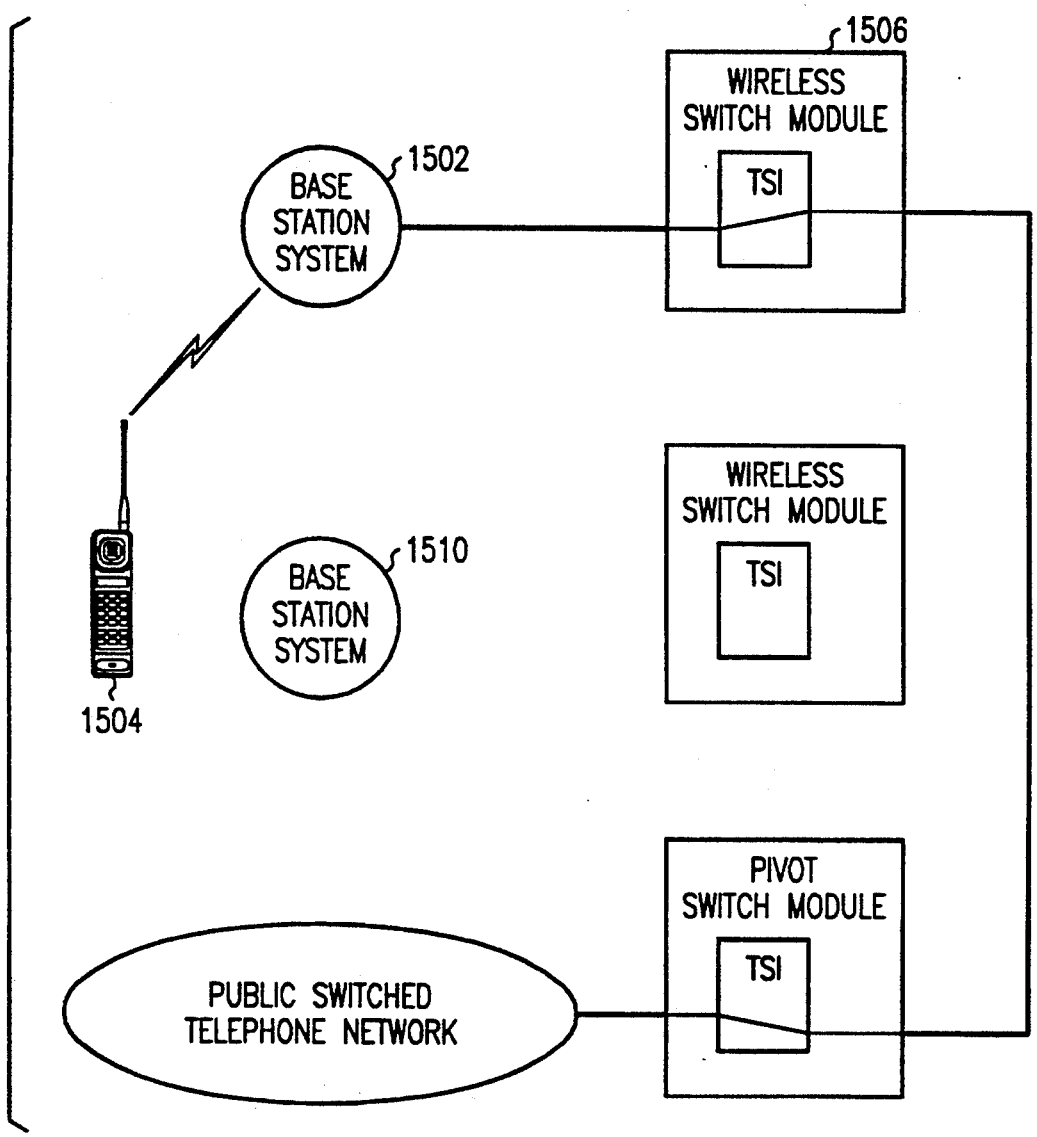
FIGS. 15-18 illustrate the handover process.
Figure 16:
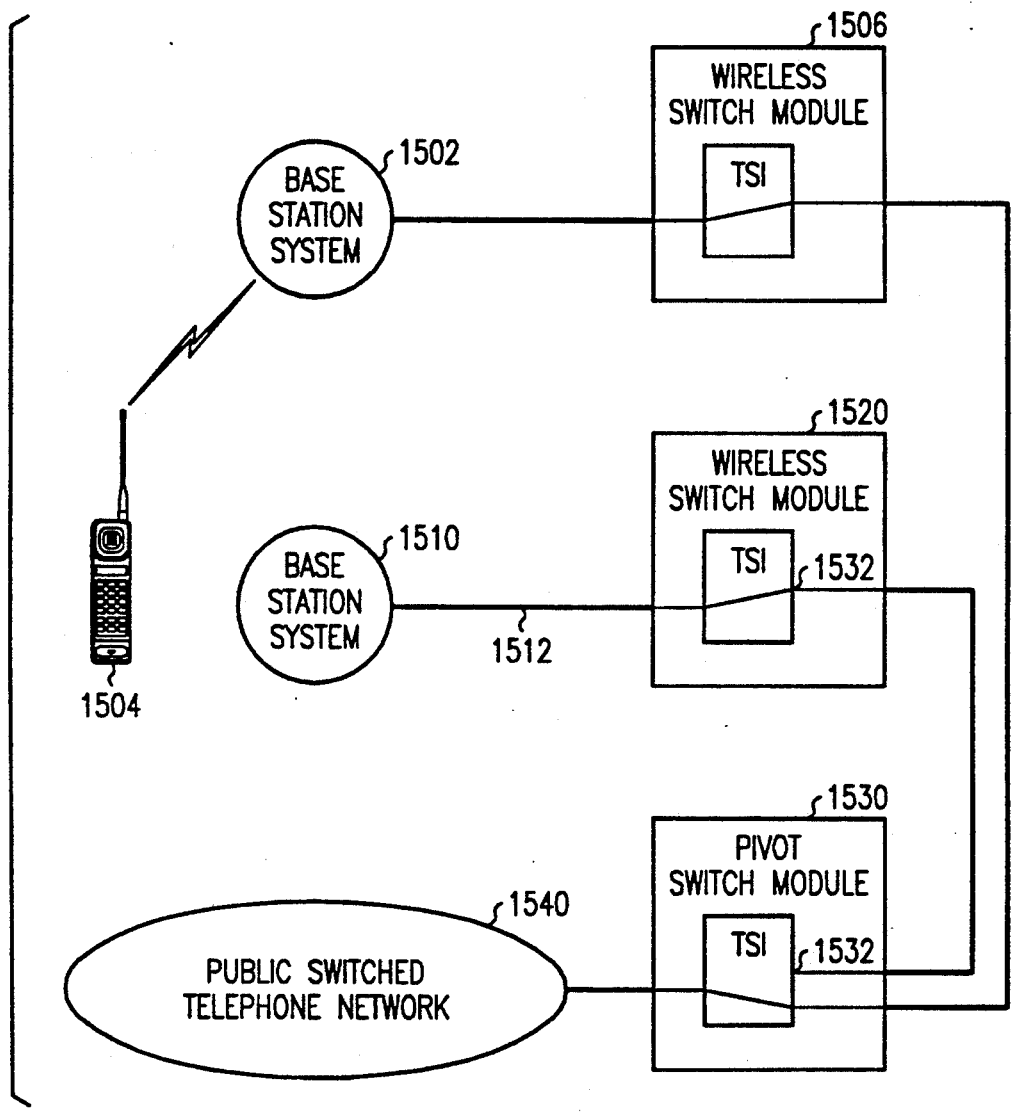
Figure 17:
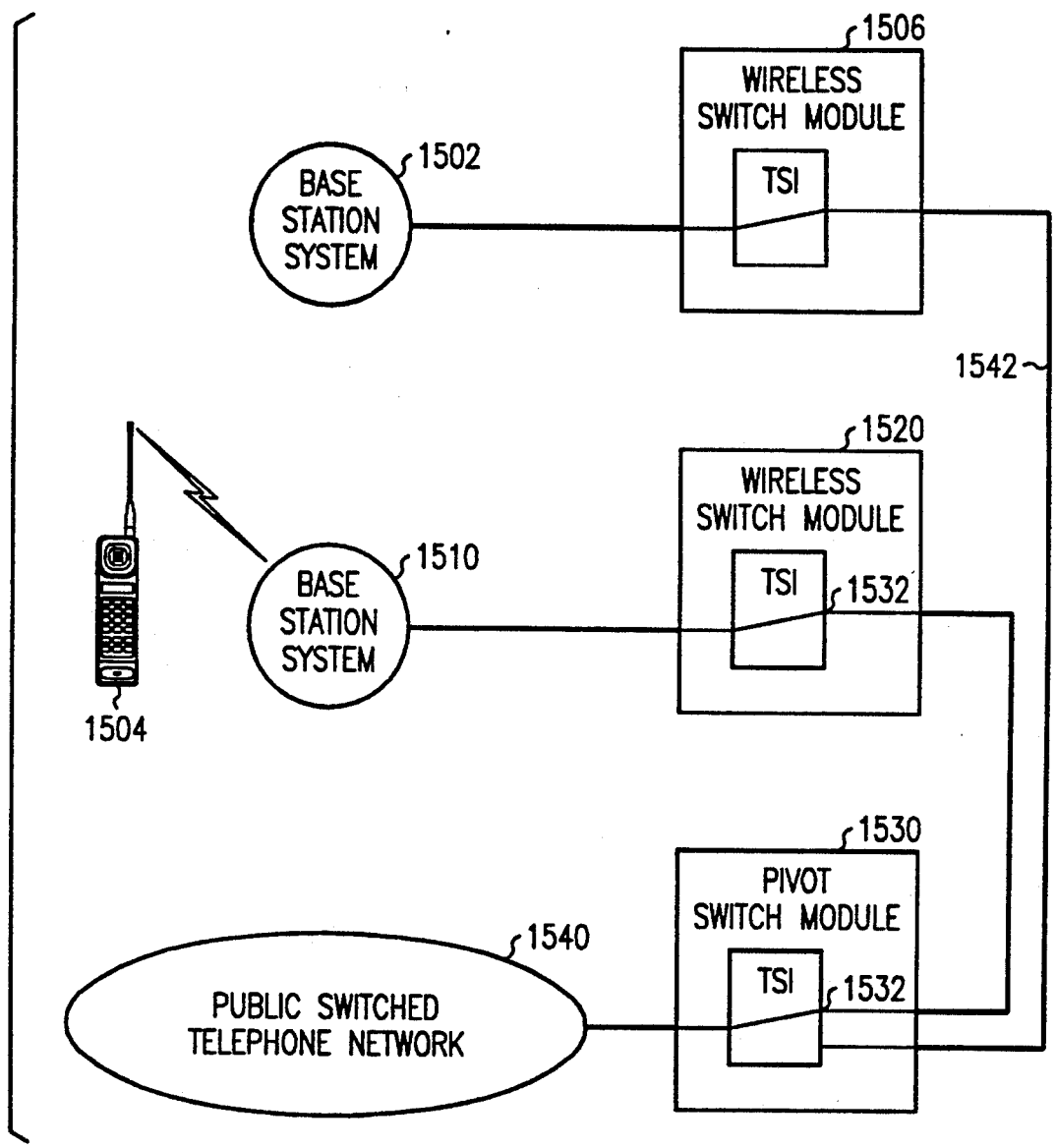

Next, the disconnect process will be discussed (FIG. 14). It will be assumed that the mobile disconnects first. The mobile sends a disconnect message 1402 to the WSM whose terminal process is controlling the mobile end of the call and the WSM transmits a release message 1404 to the mobile and a network release request 1405 to the SM connected to the public switched telephone network. The mobile then transmits a release complete message 1406 to the WSM. The SM releases the call and transmits a network release message 1410 to the public switched telephone network. The SM also transmits a message 1412 to the administrative module to release the trunk to the PSTN and the WSM sends messages 1414 to administrative module for releasing the BSS trunk and 1416 for making a billing record of the call if necessary. (Several billing records are sent in one message so that not every call generates a billing message from an SM to the AM.) The WSM also sends a release message 1418 to the VLR-WSM to update the status of the mobile station of the call. The VLR-WSM sends a clear command 1420 to the WGSM for clearing the connection information for messages if the call is the last transaction for the mobile station. (If other transactions, such as the delivery of a message waiting signal message, are required, the connection is kept up; the VLR remains involved in call control, but not the WSM attached to the BSS for controlling the call.) The WGSM sends a clear command to the BSS to release the radio channel and receives an acknowledgment 1424 from the BSS that the radio channel has been released. The BSS sends a clear command 1426 to the mobile station to release the transmitting channel. The WGSM then sends a clear complete message 1428 to the VLR-WSM to confirm that the mobile station is now released.

The handover procedure will now be described. Since a mobile station may travel during the course of a call, it could easily get outside the effective range of the base transceiver stations of one BSS and into the effective range of another. Under these circumstances, it is important that the mobile station be returned to a frequency of a transceiver of the second BSS and that the call be continued via that transceiver. The process will first be described in terms of the connections, then in terms of the message exchanges.

Figure 18:
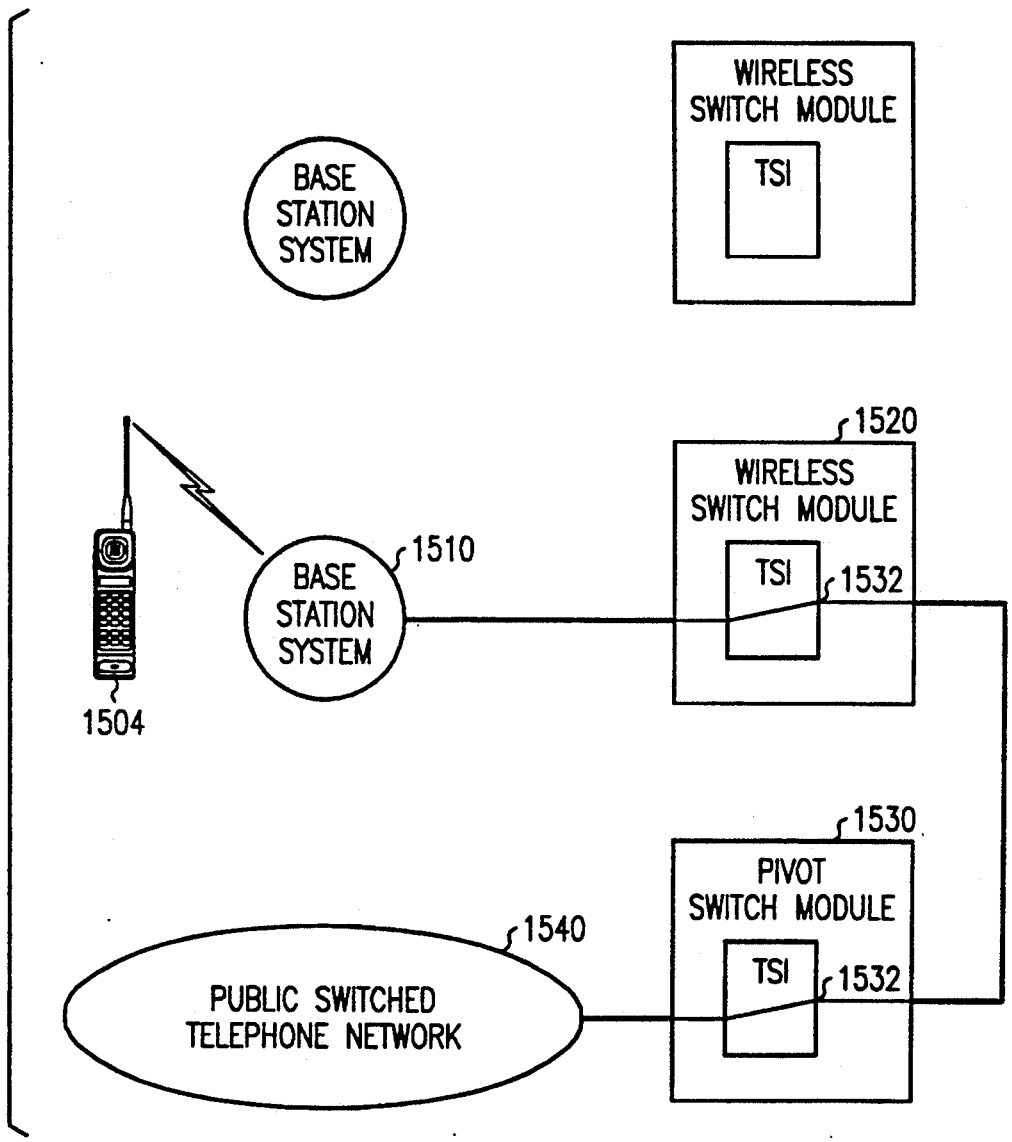

FIGS. 15-18 illustrate the process of a handover to a base transceiver station in another BSS served by the same MSC. The request is originally made from the BSS 1502 serving the call in response to a message from the mobile station 1504 reporting the signal strengths of the serving base transceiver station and nearby candidate base transceiver stations. At this time the call is served from BSS 1502 and wireless switching module 1506. The wireless switch module 1506 selects a new base transceiver station which is, in this example, on a new BSS 1510. The administrative module selects a trunk 1512 (FIG. 16) between wireless switching module 1512 and BSS 1510. The administrative module also selects a network time slot 1532 between the switching module 1530 (the pivot module) connected to the land-based station via the public switched telephone network 1540 and the wireless switching module 1520. BSS 1502 then sends a message to the mobile station to retune to the transceiver system of BSS 1510. At the completion of retune (FIG. 17), the connection through the time slot interchange in the pivot module is switched to the connection 1532 to wireless switch module 1520. At this point, the land-based station is connected through the public switched telephone network 1540, through pivot switch module 1530, and through WSM 1520 and BSS 1510 to the mobile station 1504. Finally, the old resources, namely the connection 1542 between the pivot module 1530 and WSM 1506 as well as the connection between WSM 1506 and BSS 1502 are released as are the radio resources for the call in BSS 1502 (FIG. 18).

Figure 19:
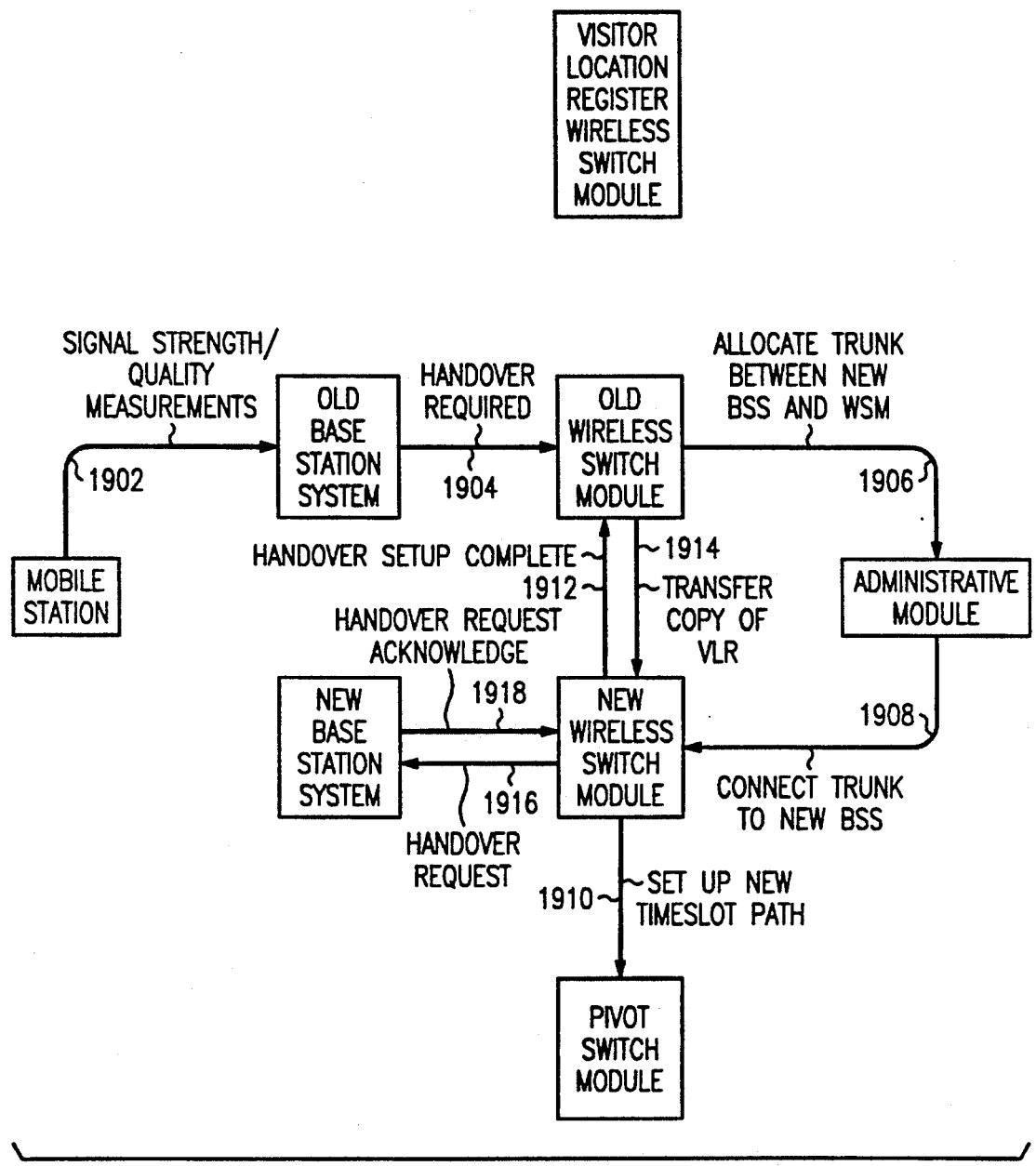
FIGS. 19-21 illustrate the handover process in terms of message exchanges.
Figure 20:
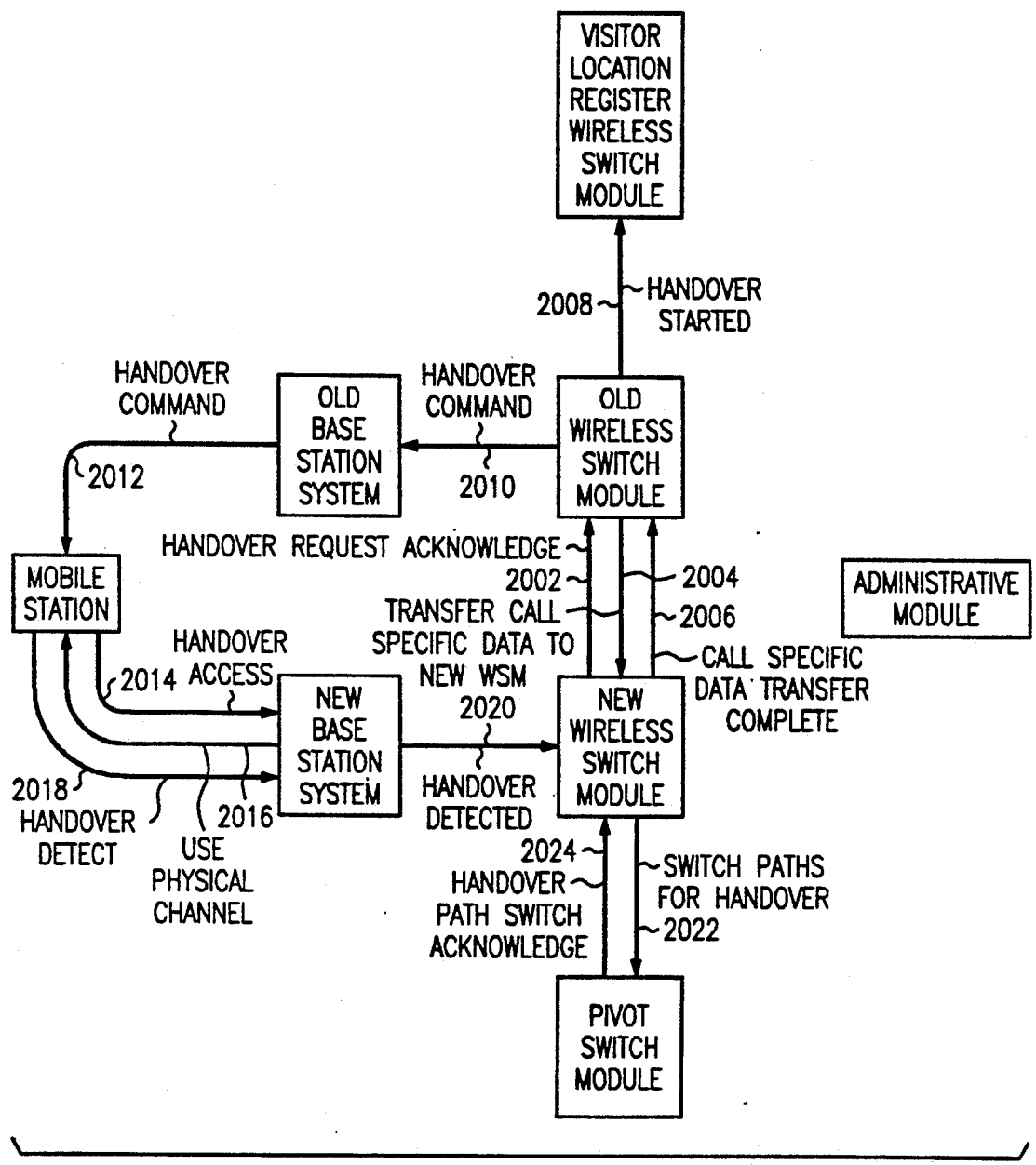
Figure 21:
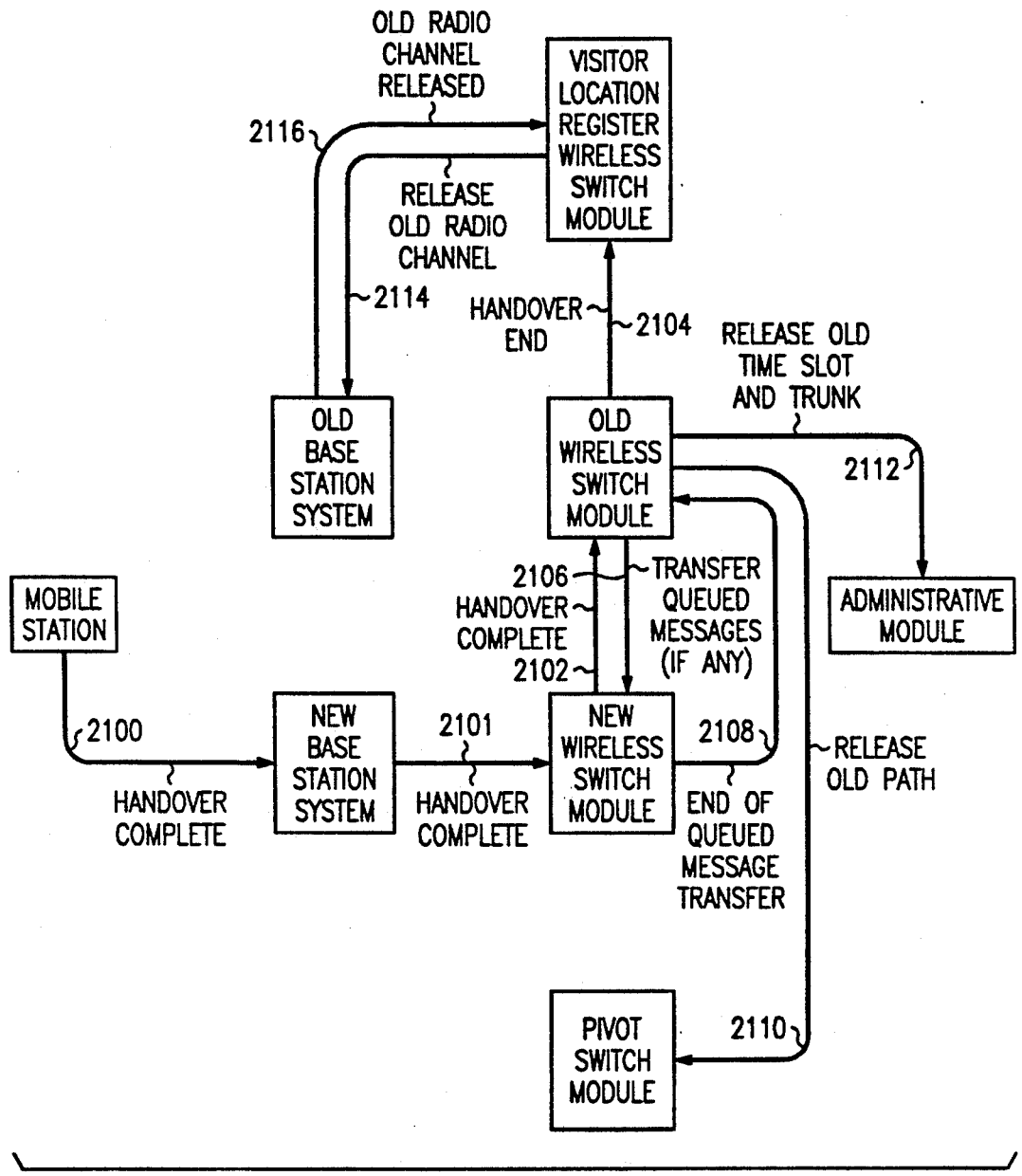

The handover process will now be described (FIGS. 19-21) in terms of the appropriate message exchanges. According to the standards discussed previously, a mobile station performs the task of measuring the strength of signals received from different BSSs in its vicinity. The mobile station periodically sends the measurements message 1902 (FIG. 19) to the base station currently serving that station. If the BSS detects that the signal from the BSS currently serving that mobile station is below the threshold of signal strength required for reliable communications, the BSS sends a message 1904 to the WGSM of the mobile switching center including an ordered set of candidate base transceiver stations for handling the call further. The WGSM delivers the message 1904 to the WSM currently handling the call (the old WSM), indicating that a handover is required and passing the list of candidate base transceiver stations. The old WSM after consulting the terminal process for the mobile station to determine that handover may proceed, passes this information via message 1906 to the administrative module for the allocation of a trunk to the first candidate BSS. The administrative module transmits a message 1908 to the WSM connected to the selected trunk of the BSS (the new WSM) and the new WSM transmits a message 1910 to the switching module connected to the land path (the pivot SM) to set up a second time slot path for use with the new connection from the public switched telephone network to the new WSM, and to inform the pivot SM of the new WSM and new terminal process identity. The new WSM sends a message 1912 to the old WSM indicating that the new path setup is complete and the old WSM transfers the copy (message 1914) of the VLR information which it has stored associated with the terminal process for this call to the new WSM. The new WSM then sends a handover request message 1916 to the new BSS for assigning a channel in the new BSS, and the new BSS returns an acknowledgment 1918. The handover request acknowledgment includes the frequency and channel which the new BSS will use to communicate with the mobile station.

The new WSM sends to the old WSM a handover request acknowledgment 2002 (FIG. 20) which includes the identification of the new frequency and channel to which the mobile station is to be tuned. The old WSM transfers that call's specific data to the new WSM via message 2004 and defers processing of all messages to and from the MS that are being sent to the old WSM. Such messages will subsequently be forwarded to the new WSM. The new WSM returns a message 2006 indicating that the call's specific data transfer has been completed, and the old WSM transmits message 2008 to the VLR-WSM, indicating that the actual channel switching is about to start and requesting the VLR-WSM to defer the processing of new input signals. (Examples of new input signals whose processing is deferred during handover are short message delivery requests, e.g. a request to deliver a "turn on voice message waiting lamp" short message, or new calls to the mobile station.) The old WSM then transmits a handover command 2010 to the old BSS, which forwards that handover command 2012 to the mobile station. In response to this handover command, the mobile station tunes to the new assigned frequency and channel for communicating with the new BSS. The mobile station then transmits a handover access message 2014 to the new BSS which transmits a message ("use physical channel" message 2016) requesting the mobile station to establish frame synchronization with the base station physical channel. The mobile station transmits a handover detect message 2018, indicating that a physical layer connection has been established to the new BSS, and that the mobile station has retuned. The new BSS transmits a message 2020 to the new WSM that the handover has been detected, which, in response to that message, requests the pivot SM to switch to the new path (message 2022). The pivot SM switches to the new path and transmits an acknowledge message 2024 to the new WSM.

After the layer 3 protocol is established, the mobile station sends a handover completion in message 2100 (FIG. 21) to the new BSS which forwards the message 2102 to the new WSM. The new WSM then transmits to the old WSM a message 2102 (FIG. 21) that the handover has been completed and the old WSM transmits a message 2104 to the VLR-WSM that the handover has been completed; this message includes the identity of the new WSM. The old WSM transmits to the new WSM any queued messages 2106 for this mobile station and the new WSM acknowledges the end of this message transfer (message 2108). The old WSM transmits a message 2110 to inform the pivot SM to release the old path. The old WSM also transmits a message 2112 to the administrative module to release the old time slot. In the meantime, the VLR-WSM, in response to the receipt of the handover end message 2104, transmits message 2114 to the old BSS to release the old radio channel, and the old BSS releases this channel and transmits an acknowledgment 2116 to the VLR-WSM.

In the transitional stages, the new WSM is connected to the pivot SM but the path is not continued through the time slot interchanger of that SM for connection to the far party. This connection is made after the mobile station has tuned to the radio frequency of the new BSS, and is made at the same time as the old time-slot interchange connection for connecting the current WSM to the public switched telephone network, is dropped. Thus, only one connection is made through the SM connected to the far party and that connection is made through the time-slot interchange of that switching module. This permits a very rapid transition from one connection to another, since all other connections are made before the time-slot interchange connection is switched.

As long as a mobile switching center continues to serve a particular mobile station, the VLR for that mobile station is maintained in that mobile switching center and is retained in the same switching module of that mobile switching center even as the mobile moves to different areas served by that switching center. (The procedures for handing over a mobile station from one mobile switching center to another are beyond the scope of this Detailed Description.) Since the switching module which contains the call data for serving a call for a particular mobile station, retains the bulk of the information from the VLR, and further retains the identity of the switching module that contains the base copy of the VLR, there is no need to move that base copy even when a mobile moves and is subsequently served by a different wireless switching module.

Figure 22:
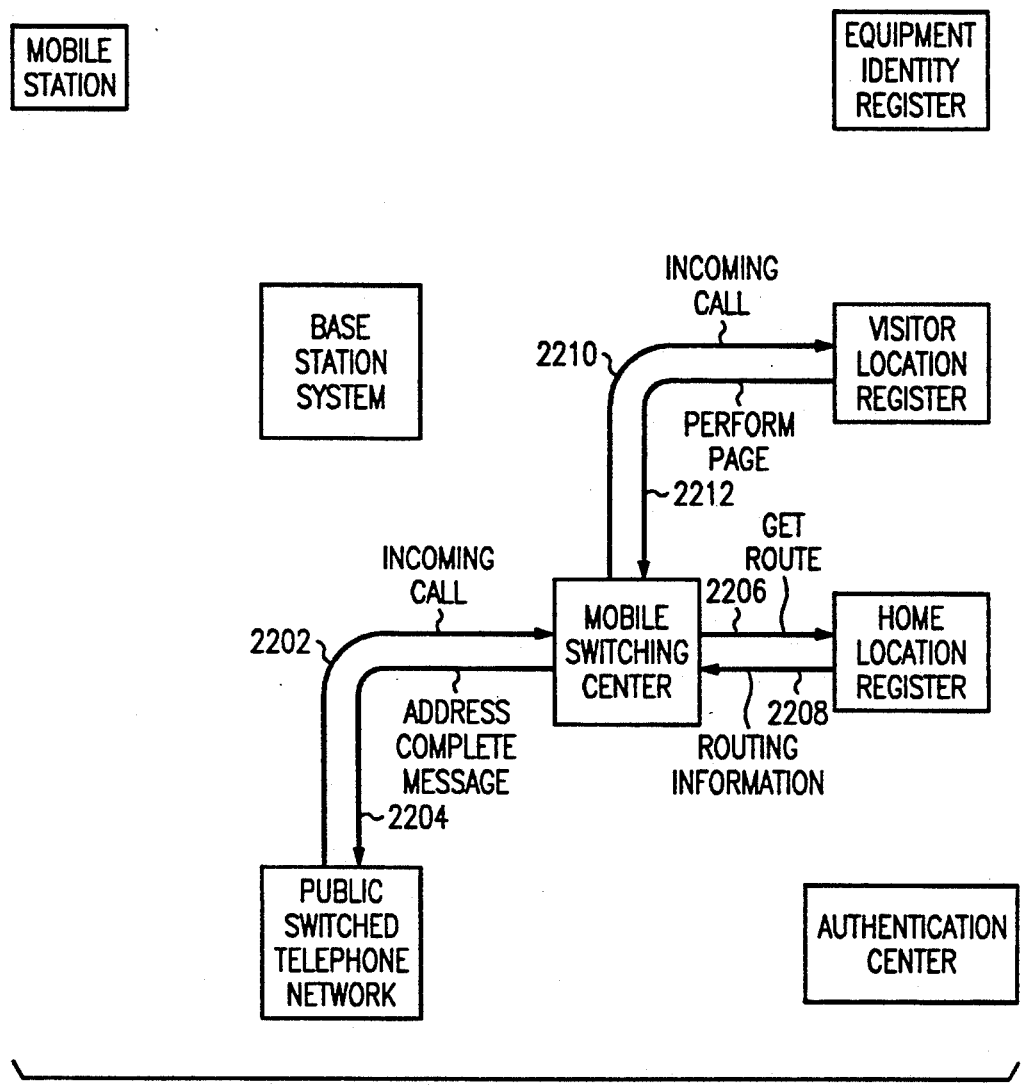
FIGS. 22-28 illustrate an incoming call to a mobile station.

A land-to-mobile call will now be described. An incoming call message 2202 (FIG. 22) is received from the public switched telephone network at the mobile switching center. (Note that the land-to-mobile call could also originate in the mobile switching center.) For the case of SS7 signaling on the incoming side, the mobile switching center sends an address complete message 2204 to the public switched telephone network. The MSC which received the incoming call is the MSC that, on the basis of the telephone number, is the "home" for this mobile station. (The procedure for handling calls with base HLR information in another MSC is beyond the scope of this Detailed Description.) This MSC contains the base HLR information for the mobile unit.

The MSC consults the HLR for that mobile unit in the appropriate wireless switching module (action 2206), and obtains information as to which MSC is currently serving the mobile unit (action 2208). If the mobile unit is currently roaming and outside the range of the home MSC, the MSC reroutes the call to the MSC that serves the mobile unit. In this example, the mobile station is controlled by the home MSC. If the mobile station has requested that calls be forwarded to another number, this will also be reported to the MSC for further processing, either by the MSC if the call forwarding number is served by the home MSC, or for further processing by another MSC or the public switched telephone network, if the call forwarded number is not served by the home MSC.

In this case, assume that the mobile station has not requested call forwarding and is being served by the home MSC. The MSC determines the WSM which contains the VLR of the mobile station, which VLR is integrated in the MSC for this embodiment. The MSC queries that VLR (action 2210). The VLR determines the most recent location area of the mobile station, in order to have the mobile station paged by the BSSs in the most recent location area. The VLR responds with the identity of the location area for performing the page (action 2212).

Figure 23:
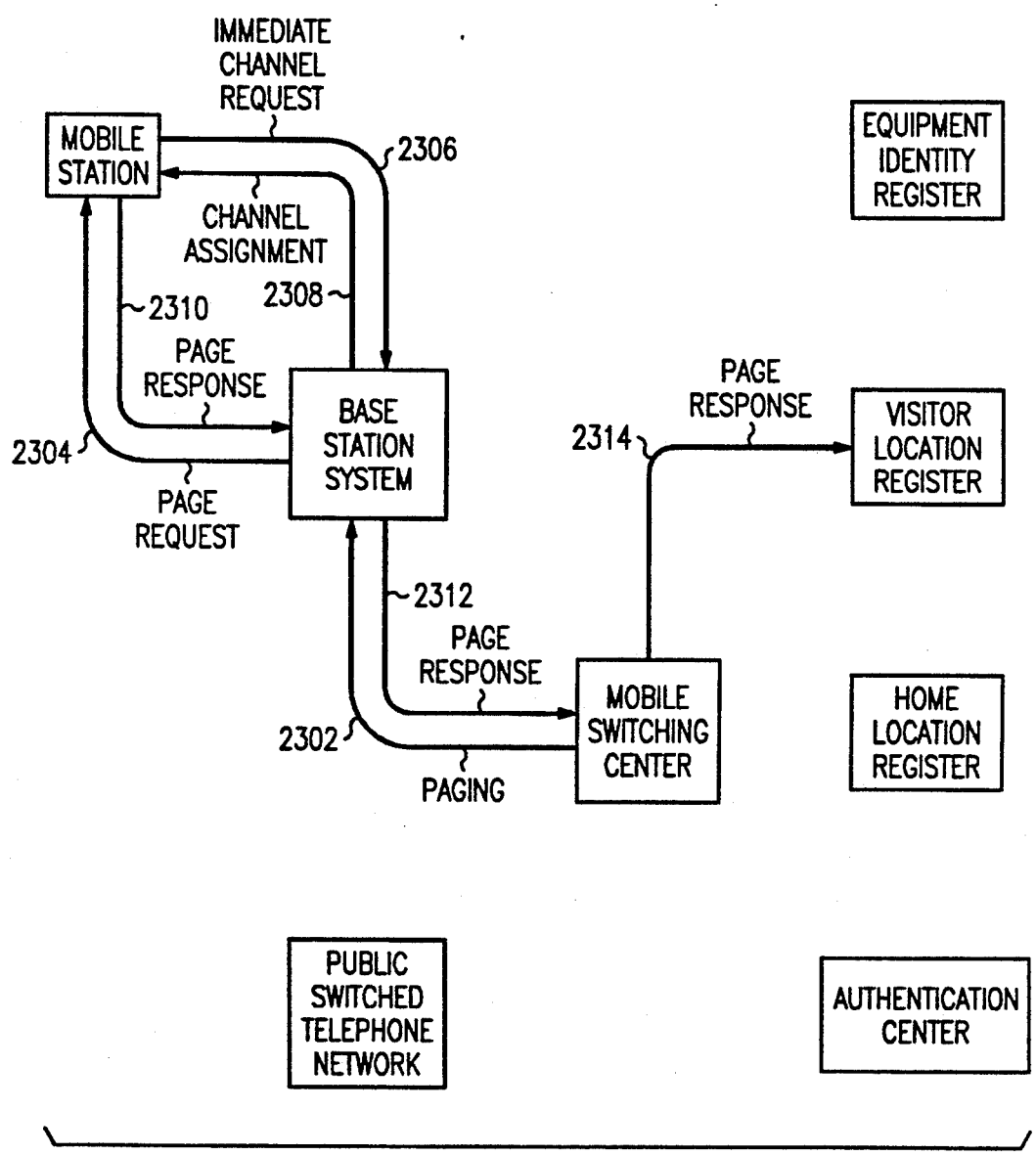

The MSC then sends a message 2302 (FIG. 23) to the BSSs serving the location area requesting the page. The BSSs send out paging signals (action 2304) and the mobile station responds to this request (action 2306) via one of the BSS, with a request to assign a control channel to this mobile station. That BSS transmits to the mobile station a channel assignment 2308 for the dedicated control channel to be used. The mobile station tunes to that control channel and delivers its page response 2310 over that control channel.

Under the principles of the GSM standard for mobile communications, a mobile unit is tuned to a single paging channel. If the mobile unit is turned on, it tunes to the paging channel of the base transceiver station with the strongest signal. This is done by taking signal strength measurements of the broadcast channels of several nearby base transceiver stations and selecting the system with the strongest signal. The mobile station then tunes to the common control channel, paging subchannel of that system. If a mobile unit has moved across location area boundaries while the mobile station is powered on but not in the connected state, then the mobile station will send a location update message to the MSC which is used to update the VLR for that mobile station. The mobile station recognizes this transition because its internal record of a location area differs from the location area signal received from the base transceiver station via the broadcast control channel.

When a mobile is originally paged, it is paged by all the transceiver stations in the location area where the MS has last registered. This paging message is transmitted from the protocol handlers of the wireless global switching module to all the appropriate base station controllers. Within the WGSM, a paging request message received from a switching module contains the location area identifier (LAI). This is translated to derive a series of point codes for the BSSs that contain Base Transceiver Stations which must broadcast the page. The PH that received the paging request message from the switching module broadcasts a message to the WGSM protocol handlers that also includes the identity of the mobile (the IMSI or TMSI as discussed hereinafter with respect to the authentication procedure), the point codes and a single logical route, effectively appended to each point code. The logical route is a four bit quantity used to spread the signaling traffic over the different signaling links to the BSSs. Each protocol handler examines the point codes and the logical route to see if it is involved (i.e., serves a signaling link that is used) in transmitting paging request messages. Each involved protocol handler transmits a paging request message to each of these BSS controllers for which that protocol handler is the designated source of paging messages for the point code and logical route; this paging request message includes a list of the BTSs in the LAI so that a BSS that includes portions of two or more LAIs can transmit a paging request only to the base transceiver stations serving that LAI. In an alternative version, not covered by the present GSM specification, the LAI is sent and the BSS translates to find the appropriate base transceiver station for paging.

An alternate approach is to make a translation within the protocol handler that receives the paging request message from the switching module to determine which protocol handlers of the WGSM should receive a multicast paging message that includes the point codes of the BSSs and the logical route for those BSSs involved in the paging, plus a list of base transceiver stations. Each of the determined recipients of this multicast message then translates the point codes and logical route to see if it is to transmit a paging message; if so it transmits the appropriate paging message. In this approach, the initial translation to determine which protocol handlers may be involved in the process of transmitting paging request messages to base station controllers is performed in the single protocol handler that initially receives the paging request message. A disadvantage of this approach is that each of the protocol handlers that makes the initial translation needs a table for storing the translation information. The simpler translation of the preferred embodiment is only from the LAI to point codes, a relatively static translation. The updating of protocol handlers to respond to trouble conditions only affects the tables of protocol handlers actually transmitting data to the BSSs.

Figure 24:
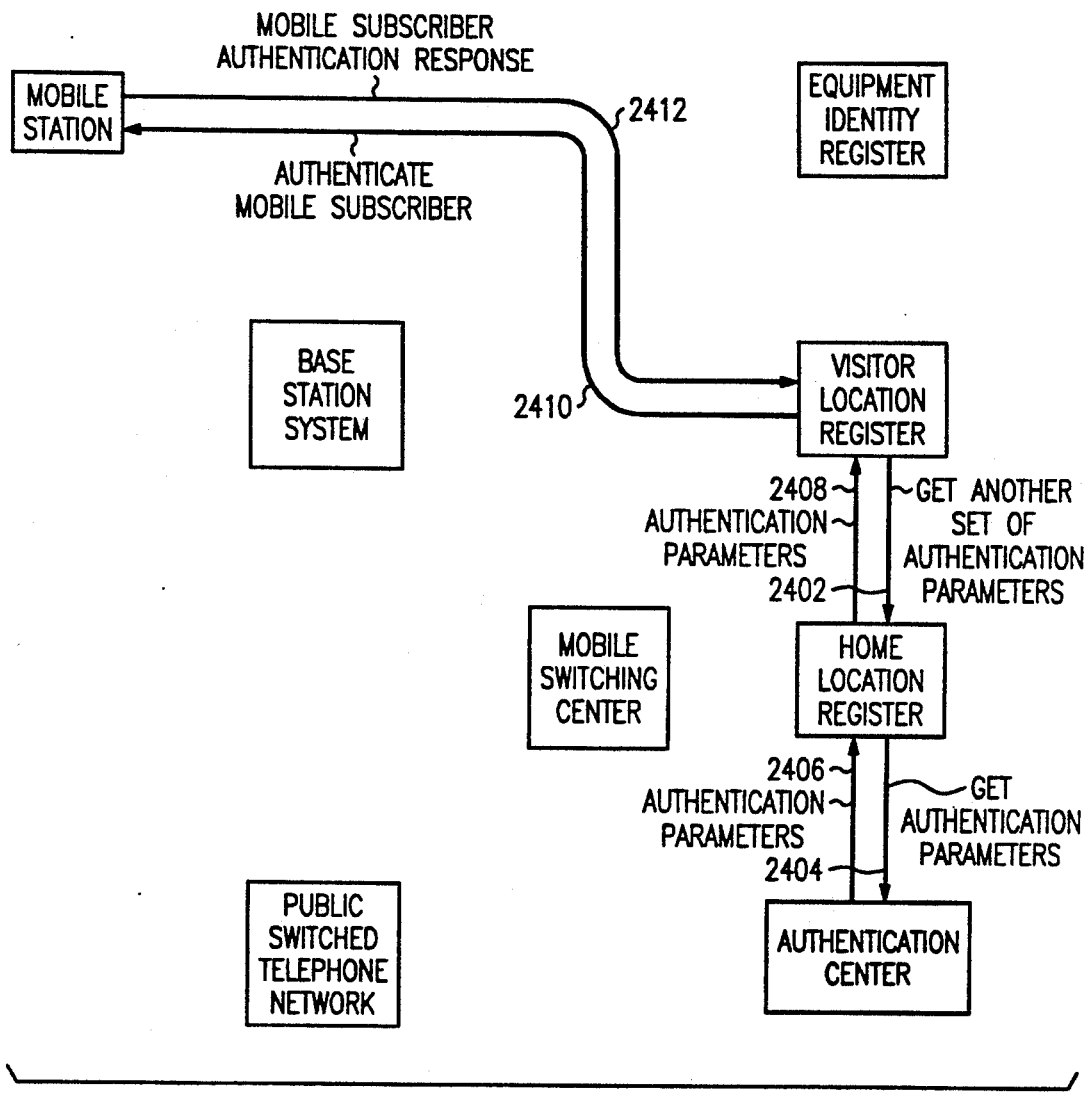

The page response 2310 received by one of the BSSs is returned (message 2312) to the mobile switching center, specifically, the WGSM. The WGSM then transmits a message 2314 to the wireless switching module which contains the VLR information for this mobile station to initiate the authentication process if necessary. Previously, the VLR has received from the authentication via the HLR five sets of data used for authenticating the identity of the mobile station and for use as an encryption key. If the VLR has only one set left, then it obtains an additional set via the HLR from the authentication center, using messages 2402, 2404, 2406 and 2408 (FIG. 24). The VLR-WSM communicates to the mobile station an authentication request 2410 for it to perform algorithm calculation. The mobile station then communicates the result (message 2412) of the calculation to the VLR-WSM which compares the result with the authentication data it stores.

Figure 29:
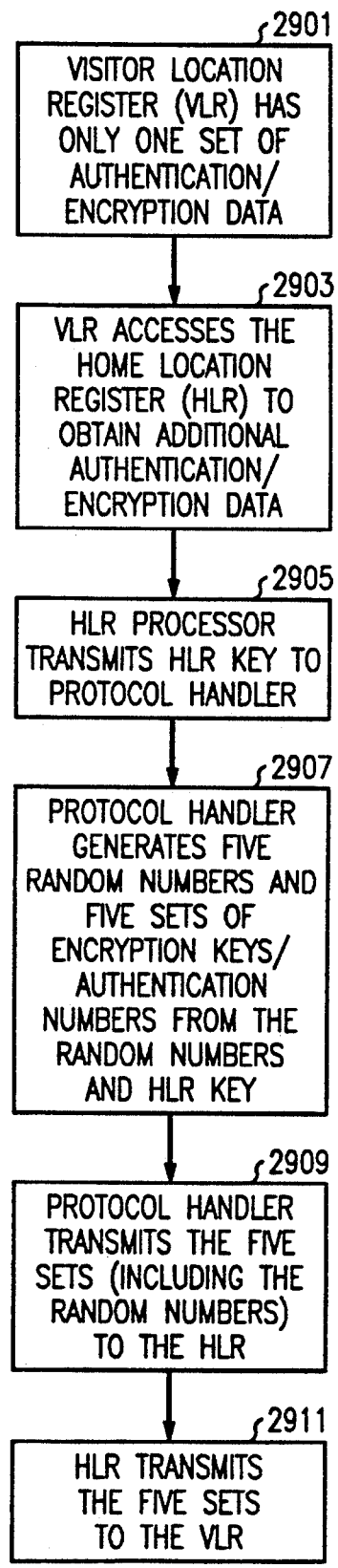
FIG. 29 illustrates the process of obtaining authentication numbers and encryption number.

FIG. 29 illustrates the process of obtaining authentication numbers and encryption numbers in accordance with the principles of applicants' invention. The visitor location number recognizes that it has only one set of authentication/encryption data (action block 2901). The VLR accesses the home location register (HLR) to obtain additional authentication/encrytion data (action block 2903). In this embodiment, if the VLR and HLR reside in the same MSC, the VLR control program accesses the HLR by transferring control to the HLR control program. The HLR which stores an authentication/encryption parameter (the HLR key) transmits this parameter to a protocol handler (action block 2905). The protocol handler generates five random numbers and using these five random numbers and the HLR key, generates five sets of encryption keys/authentication numbers from the random numbers and the HLR key (action block 2907). The protocol handler then transmits the five sets to the HLR (action block 2909) and the HLR transmits the five sets to the VLR (action block 2911). (In the context of this embodiment, if the HLR and the VLR are contained in a single block, then the VLR access is simply the process of reading another part of the combined block and the HLR and VLR processors are the same. Similarly, it is not necessary for the HLR to transmit the five sets to the VLR because the storage is combined.)

Figure 25:
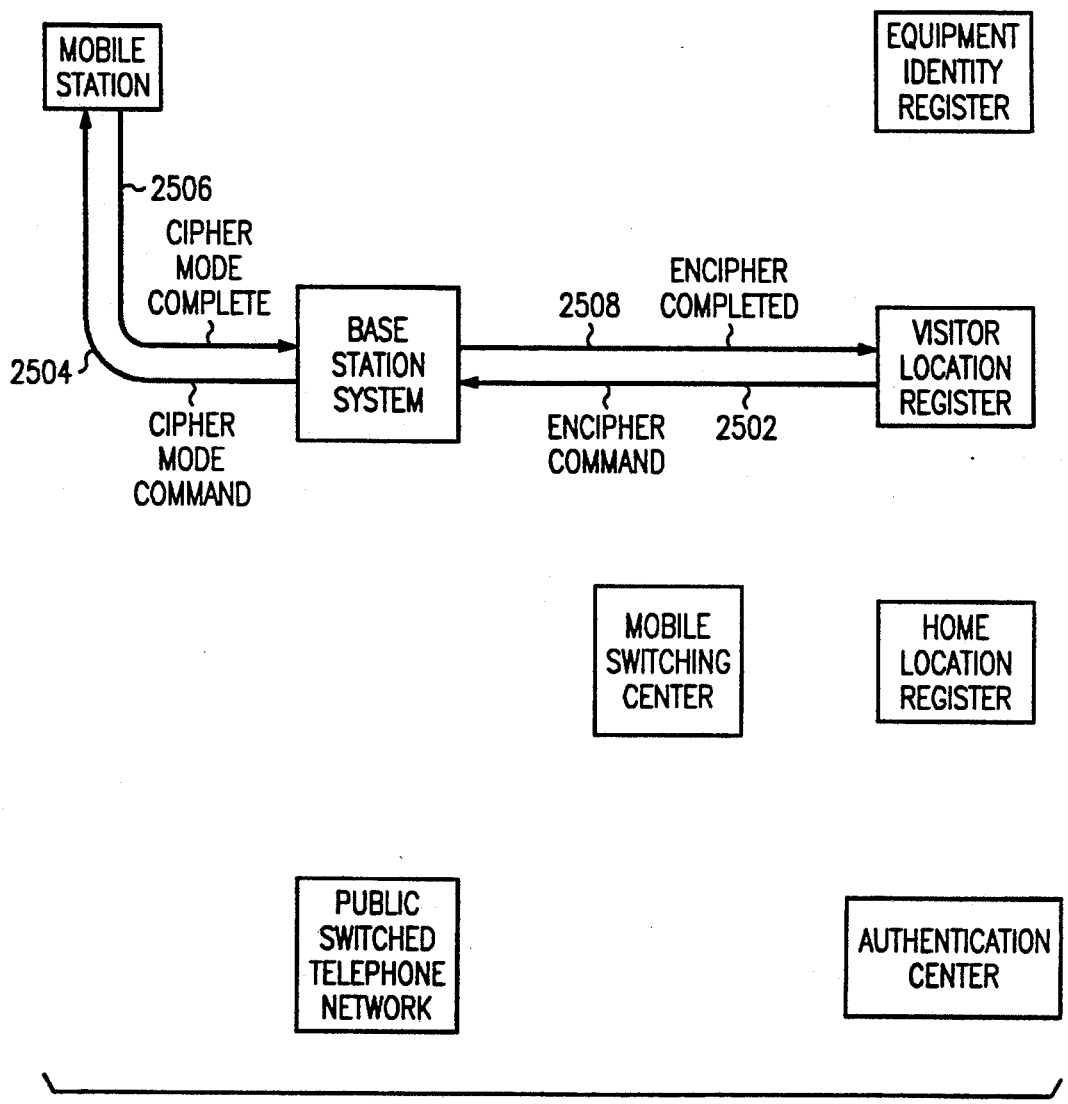

The VLR then transmits an encipher command (message 2502, FIG. 25), if necessary, to the BSS which transmits, over the radio channel, a cipher mode command 2504 requesting the mobile station to enter the cipher mode. The mobile station responds with a cipher mode complete message 2506 to the BSS and the BSS reports to the switching module containing the VLR that the encipher process has been completed (message 2508). The original encipher command sent from the VLR to the BSS includes the key for use in enciphering the signals transmitted between the mobile station and the BSS. The mobile station had previously received information for deriving the key during the authentication process.

Figure 26:
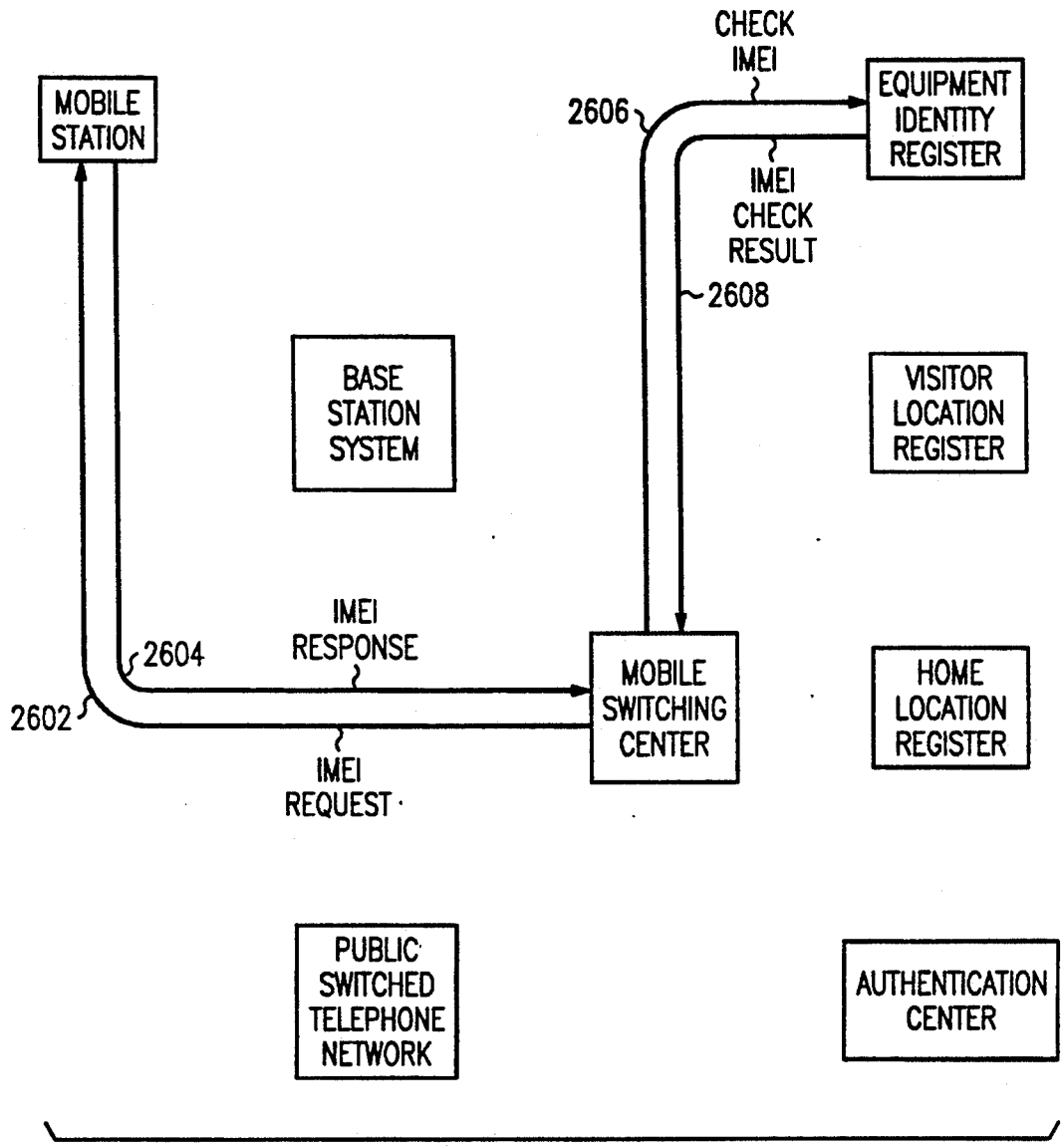

If the telecommunications operator has specified that an equipment identity check is required, the mobile switching center then requests (message 2602, FIG. 26) from the mobile station its international mobile equipment identification (IMEI). The mobile station responds with that information (message 2604) and this information is checked (action 2606) in the equipment identification register (EIR) data base also stored in the MSC for that mobile. The check result is returned (action 2608) from the EIR. The equipment validation is performed to insure that the mobile unit is authorized to make calls. Calls are only completed if both the VLR and the EIR data indicate that the mobile is authorized to make and/or receive calls.

Figure 27:
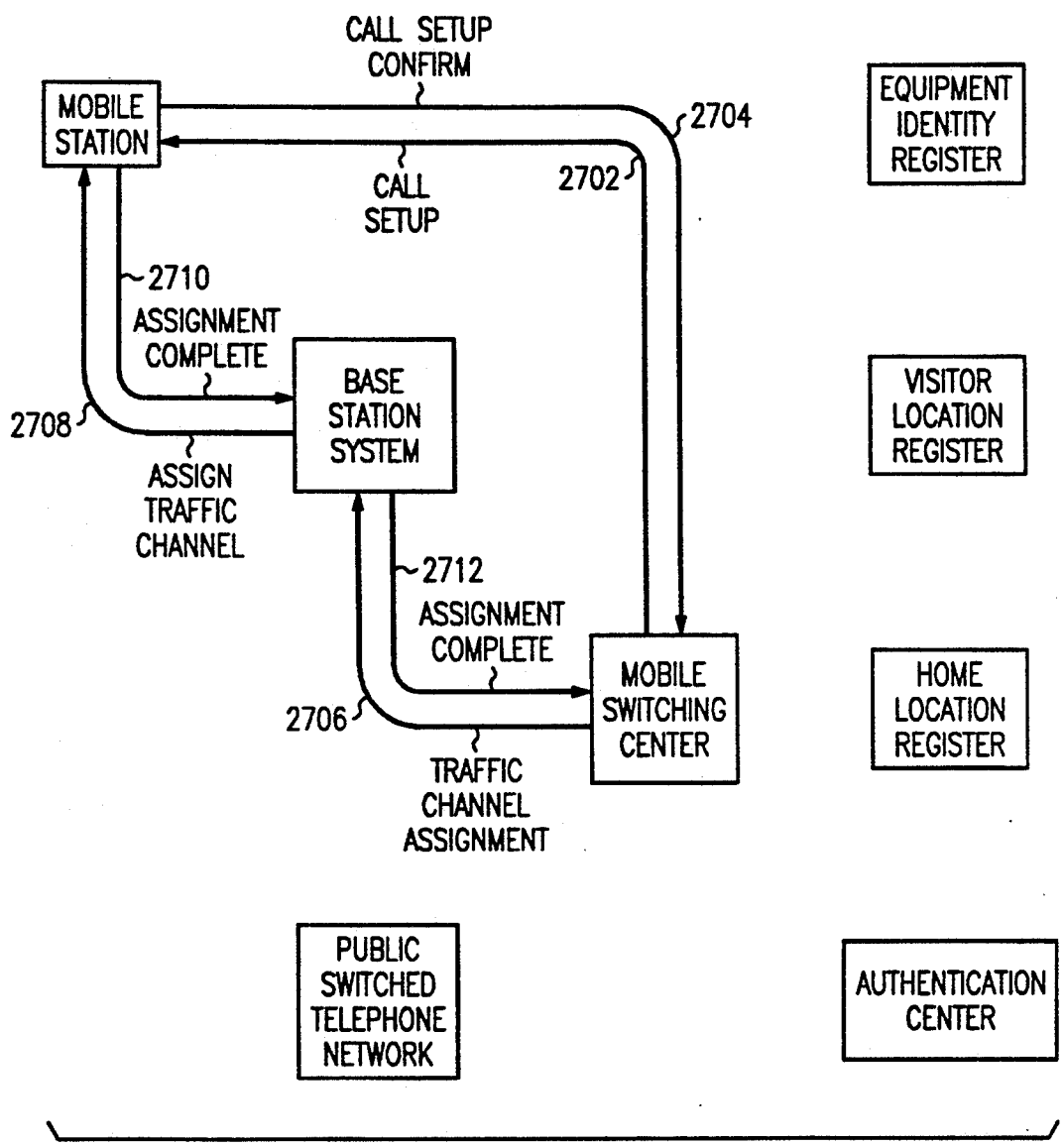

Thereafter, the mobile switching center sets up a call connection to the mobile station. It transmits a message 2702 (FIG. 27) including a transaction identification for all messages generated by the mobile station, respecting this call. The mobile station responds with a call confirm message 2704. The mobile switching center then requests (message 2706) the base station to assign a traffic (i.e., voice or customer data) channel to this call.

The BSS selects the radio frequency and channel and informs the mobile station (message 2708) of the same so that the mobile station can tune to this frequency and channel. The mobile station does so, reports (message 2710) that the channel assignment has been completed, which permits the BSS to report (message 2712) to the mobile switching center that the traffic channel has been assigned.

Figure 28:
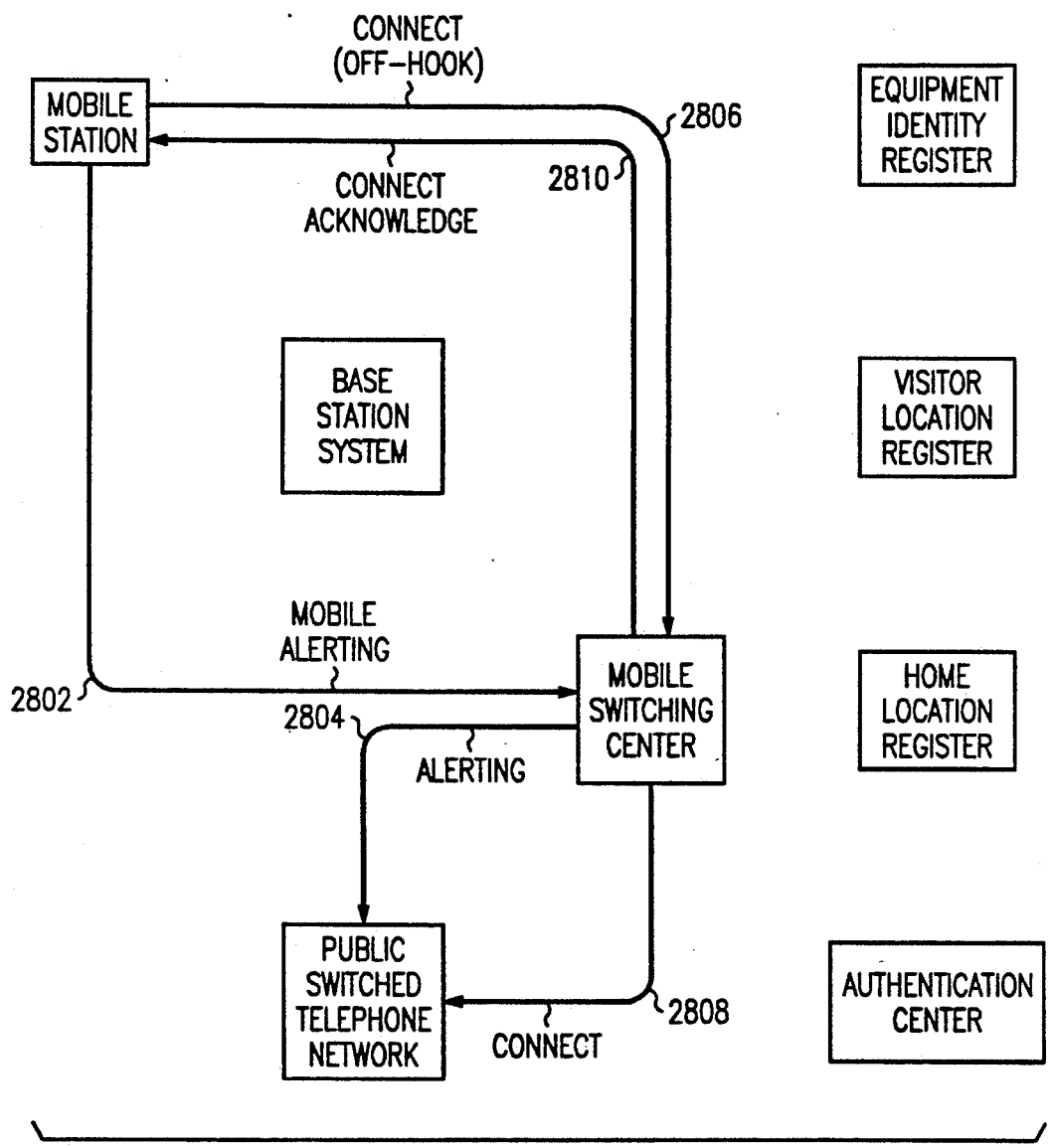

The mobile station responds to the previously received traffic channel assignment request by locally generating an alerting signal to the subscriber. An "alert" message 2802 (FIG. 28) is sent from the mobile station to the MSC to inform the MSC that mobile station user is being alerted. The mobile switching center transmits an audible tone to the caller (action 2804). When the called customer at the mobile station goes offhook, i.e., answers the call, the mobile station sends a connection indication 2806 to the mobile switching center, which forwards that connection indication to the far party (action 2808) and transmits a connection acknowledge message to the mobile station 2810.

In order to detect the fraudulent condition wherein two or more mobile stations have the same identity, a situation which should not occur and will occur only as a result of an attempt to fraudulently cause telecommunications charges to be incurred by the primary owner of that identification, the following steps are taken.

Each of a class of state transitions is examined to see if the particular state transition is likely, in view of prior state of the mobile station. Whenever a mobile station changes state to one of the specified states, the previous one of the specified states for that mobile station is examined and if the transition is unlikely, a record is made for the mobile telecommunications network administration. These records are an indication of possible fraud. The state transitions to which are examined are the following: attached mobile station, detached mobile station, page response, location update, service request, and cancel location (a message from an HLR to a VLR to indicate that the mobile has moved outside the area served by the MSC, and therefore, the VLR). Unlikely events include the reception of an attach, when the mobile station is already attached, a detach when the mobile station is already detached, the receipt of multiple page responses for a single page request of one mobile, the receipt of a location update while another update procedure or connection procedure is in progress; the receipt of a service request when a mobile station is detached, in a location update procedure, or during an attach or detach procedure; or a change location message received when a call is in progress.

Whenever a state change is one that is unlikely to occur, a peg count is made of the state change. The frequency of the unusual occurrences is displayed at a mobile switching control center or the Operation and Maintenance Center (OMC) so that a fraudulent use of an identification can be detected. If the count exceeds a threshold, a special message is displayed or printed.

The authentication process will now be described. The authentication process is initiated as a result of a service request by the mobile station or following a successful page of a mobile station, but is performed primarily under the control of the VLR. According to the wishes of the telecommunications operator, this authentication process may be performed every time a mobile station originates or a call is terminated to a mobile station. In addition, if the administration of the mobile switching system so desires, the authentication may take place whenever a location is updated for a mobile station that is in the power-on and idle state. In addition, authentication may be performed when a mobile station registers by turning on its power.

In the case of a request for service originated by a mobile station, the mobile station sends a message to the mobile switching center recording one of the requests discussed above. This message includes the IMSI (International Mobile Subscriber Identification) or a TMSI (Temporary Mobile Subscriber Identification). The choice of an IMSI or a TMSI as the primary identification mechanism is made by the system operator. The IMSI is a permanent number which is assigned to every mobile station. The TMSI is assigned to a mobile station only after an authentication, and has only local significance. If this is the first authentication request or an authentication request which for some reason has failed and the system administration is using TMSI identification, then the backup IMSI is used for the purpose of authenticating the customer and assigning a new TMSI. The source of data used in authentication is an authentication center which in the present system is present in each mobile switching module of the MSC. This authentication center (AUC) does not store any data for each customer. The purpose of the authentication center is to generate random numbers which are used in conjunction with data in the HLR to generate authentication data. Initially, at the time when a customer subscribes for service, that customer is assigned an initial key $K_c$. This key and a random number (RAND) supplied from the authentication center are acted upon by a first algorithm (A3) to generate a secondary number, an authentication number, referred to as Signed Response (SRES), a result of manipulating the random number using the A3 algorithm. In addition, the random number and $K_i$ are acted upon by a second algorithm (A8) to generate an encryption key $K_c$. Values of RAND, SRES and $K_c$ are requested from HLR as needed by the VLR. In the preferred embodiment of the invention, five sets of RAND/SRES/$K_c$ are generated and stored in the VLR each time a set of calculations is made.

When the authentication is needed, the MSC sends the random number to the MS. The MS retrieves $K_i$ from its initialization memory (which may be initialized at the time of the purchase of the mobile station) and calculates SRES and $K_c$ from the random number and the $K_i$ using algorithms A3 and A8. It then stores the $K_c$ in the main station and sends the SRES result to the mobile switching center. The mobile switching center verifies that the SRES value calculated by the mobile station matches the SRES value that has been stored in the VLR and was previously calculated. If the values match, this is a successful authentication and it is assumed that the two values of the key $K_c$ as stored in the MSC/VLR and in the mobile station are identical.

Note that with this arrangement, only the random number and SRES are transmitted over the air. The two independently generated values of the encryption key, $K_c$, each generated from the random number and each generated using a value of $K_i$ which is also never transmitted through the air, are not transmitted over the air. Since a separate algorithm is used for deriving $K_c$ and SRES, the fact that SRES and RAND are transmitted over the air does not permit an interloper to discover $K_c$.

In case authentication fails, if the system administration uses TMSI, then the IMSI is sent as a backup in case the TMSI for one reason or another became garbled. If another authentication using the IMSI is attempted and if that authentication is successful, a new TMSI is sent and actions which are based on a successful authentication can be performed. If the system administration uses an IMSI and authentication fails or if authentication fails following an IMSI backup of a TMSI, then all service except emergency service is normally denied to that mobile station.

Note that both the TMSI and the IMSI may be sent over the airwaves without compromising security since these values are useless if the $K_i$ corresponding to that IMSI is not available to a potential interloper.

Some administrations may choose not to perform an authentication on every call. If this is the case and an IMSI or TMSI has been intercepted, then a fraudulent call may be made, or a call may be fraudulently received. However, if this is a call on which authentication is made in an administration which chooses to authenticate some percentage of its calls, then authentication will fail and the failure of authentication is a warning to the administration that the particular IMSI or TMSI has been compromised.

Only a single pair of algorithms is normally used at any one time. It is possible for a system administration to vary between pairs of such algorithms but there are no plans at this time to assign two different mobiles different algorithm pairs.

It is to be understood that the above description is only of one preferred embodiment of the invention. Numerous other arrangements may be devised by one skilled in the art without departing from the scope of the invention. The invention is thus limited only as defined in the accompanying claims.

APPENDIX A
ACRONYMS AND ABBREVIATIONS

| | |
|---|---|
| AUC | Authentication Center |
| AM | Administrative Module |
| BSC | Base Station Controller |
| BSS | Base Station System |
| BSSAP | Base Station System Application Part |
| BSSOMAP | BSS Operation Maintenance and Administration Part |
| BSSMAP | Base Station System Management Application Part |
| BTS | Base Transceiver Station |
| CM | Communications Module |
| DFI | Direct Facility Interface |
| DTAP | Direct Transfer Application Part |
| EIR | Equipment Identity Register |
| GSM | Global Systems for Mobile Communications |
| ISDN | Integrated Services Digital Network |
| ISO | International Standards Organization |
| HLR | Home Location Register |
| IMEI | International Mobile Equipment Identification |
| IMSI | International Mobile Subscriber Identification |
| ISUP | ISDN User Part |
| LAI | Location Area Identifier |
| OMC | Operations and Maintenance Center |
| MAP | Mobile Application Part |
| MS | Mobile Station (personal communication station) |
| MSC | Mobile Switching Center |
| MTP | Message Transport Part |
| PH | Protocol Handler |
| PSTN | Public Switched Telephone Network |
| PSTN GSM | PSTN Global Switch Module |
| PSU | Packet Switching Unit |
| RAND | Random Number |
| SCCP | Signaling Connection Control Part |
| SIM | Subscriber Identity Module |
| SM | Switching Module |
| SMG | Special Mobile Group |
| SMP | Switching Module Processor |
| SRES | Signed Response |
| SS7 | Signaling System 7 |
| TC | Transaction Capabilities |
| TCAP | Transaction Capabilities Application Part |
| TMSI | Temporary Mobile Subscriber Identification |
| TSIU | Time Slot Interchange Unit |
| TUP | Telephone User Part |
| WGSM | Wireless Global Switching Module |
| WSM | Wireless Switch Module |
| VLR | Visitor Location Register |

We claim:

1. A method of obtaining authentication parameters for a mobile station on a mobile telecommunications call served by a first mobile switching center (MSC) comprising the steps of:

determining that Visitor Location Register (VLR) data stored in said first MSC for said mobile station has fewer than a predetermined parameter, n, of authentication parameter sets available for said mobile station, n having a value of at least 2;

responsive to said determining, requesting a second MSC which stores HLR data of said mobile station to provide a plurality of sets of authentication parameters for said mobile station;

responsive to receiving the request for authentication parameter sets, accessing a first processor means of said second MSC for storing Home Location Register (HLR) data of said mobile station, said HLR data comprising an authentication key of said mobile station;

from said first processor means, using said authentication key, accessing a second processor means of said second MSC for obtaining authentication parameters;

obtaining a plurality of sets of authentication parameters from said second processor means; and transmitting said plurality of sets of authentication parameters to said first MSC for storing said sets in said VLR data for said mobile station.

2. The method of claim 1 wherein said determining comprises determining that said VLR data has fewer than 2 authentication parameter sets available for said mobile station.

3. In a mobile telecommunication network, apparatus for deriving authentication parameters for a mobile telecommunications call comprising:

processor means of a first mobile switching center (MSC) for determining that visitor location register (VLR) data for a mobile station comprises fewer than n sets of authentication parameters, n being an integer having a value of at least 2;

said processor means, responsive to said determining, for initiating transmission of a request message to a second MSC, said second MSC for storing Home Location Register (HLR) data for said mobile station;

first processor means of said second MSC, responsive to receipt of said message, for accessing HLR data for said mobile station to obtain authentication key data, and second processor means of said second MSC, responsive to receipt of said authentication key data from said first processor means, for calculating a plurality of sets of authentication parameters for said mobile station.

* * * * *